(12) United States Patent
Kumada et al.

(10) Patent No.: US 7,557,957 B2
(45) Date of Patent: Jul. 7, 2009

(54) IMAGE PROCESSING METHOD AND APPARATUS, AND PROFILE MANAGEMENT METHOD

(75) Inventors: Shuichi Kumada, Kanagawa (JP); Manabu Ohga, Kanagawa (JP); Kenichi Naito, Tokyo (JP); Hayato Kubo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 359 days.

(21) Appl. No.: 11/704,286

(22) Filed: Feb. 9, 2007

(65) Prior Publication Data

US 2007/0133026 A1     Jun. 14, 2007

Related U.S. Application Data

(62) Division of application No. 11/223,953, filed on Sep. 13, 2005, now Pat. No. 7,206,094, which is a division of application No. 09/948,604, filed on Sep. 10, 2001, now Pat. No. 7,035,454.

(30) Foreign Application Priority Data

Sep. 12, 2000  (JP)  .............. 2000-277165
Sep. 4, 2001   (JP)  .............. 2001-267909

(51) Int. Cl.
*G06K 15/00*     (2006.01)
*H04N 1/46*      (2006.01)

(52) U.S. Cl. .............. 358/1.9; 358/522; 358/1.16
(58) Field of Classification Search ........... 358/500, 358/501, 515, 518, 519, 522, 523, 530, 1.9, 358/2.1, 1.16, 1.18, 3.23, 504, 527
See application file for complete search history.

(56) References Cited

U.S. PATENT DOCUMENTS

| | | | | |
|---|---|---|---|---|
| 5,305,119 | A |   | 4/1994  | Rolleston et al. ............ 358/522 |
| 5,307,182 | A | * | 4/1994  | Maltz ........................ 358/518 |
| 5,828,780 | A | * | 10/1998 | Suzuki et al. ............... 382/167 |
| 5,835,624 | A |   | 11/1998 | Ueda et al. .................. 382/162 |
| 5,844,699 | A |   | 12/1998 | Usami et al. ................ 358/518 |

(Continued)

FOREIGN PATENT DOCUMENTS

JP     8-130655     5/1996

*Primary Examiner*—Jerome Grant, II
(74) *Attorney, Agent, or Firm*—Fitzpatrick, Cella, Harper & Scinto

(57) ABSTRACT

An image which has been color-converted in correspondence with the output characteristics of a printing press as a target for the purpose of proof may often be printed by a copying machine or printer. Prior to the proof, a generation history of a generated profile of an output device is preferably managed. The operator sets whether or not to save parameters (saving location and profile name) associated with saving of a file and colorimetric values, whether or not to save history management information, and the like.

5 Claims, 41 Drawing Sheets

U.S. PATENT DOCUMENTS

| | | | |
|---|---|---|---|
| 5,875,260 A | 2/1999 | Ohta | 382/162 |
| 5,881,209 A | 3/1999 | Stokes | 358/1.9 |
| 5,909,220 A | 6/1999 | Sandow | 345/589 |
| 5,911,003 A | 6/1999 | Sones | 382/162 |
| 6,421,141 B2 | 7/2002 | Nishikawa | 358/1.9 |
| 6,525,721 B1 | 2/2003 | Thomas et al. | 345/594 |
| 6,643,029 B2 | 11/2003 | Kumada et al. | 358/1.9 |
| 6,919,972 B2 | 7/2005 | Kumada et al. | 358/1.9 |
| 6,995,865 B1 | 2/2006 | Motomura | 358/1.9 |
| 2002/0038337 A1 | 3/2002 | Satomi et al. | 709/203 |
| 2002/0039106 A1 | 4/2002 | Shimada | 345/604 |
| 2005/0083546 A1 | 4/2005 | Hung | 358/1.9 |
| 2005/0128495 A1 | 6/2005 | Arai | 358/1.9 |

\* cited by examiner

FIG. 2

| R | G | B | L | a | b |
|---|---|---|---|---|---|
| 0 | 0 | 0 | 0 | 0 | 0 |
| 0 | 0 | 16 | 12 | -1 | -10 |
| ⋮ | ⋮ | ⋮ | ⋮ | ⋮ | ⋮ |
| 255 | 255 | 255 | 100 | 0 | 0 |

FIG. 21

| CMYK | Lab | ΔE |
|---|---|---|
| $CMYK_1$ | $Lab_1$ | $\Delta E_1$ |
| $CMYK_2$ | $Lab_2$ | $\Delta E_2$ |
| $CMYK_3$ | $Lab_3$ | $\Delta E_3$ |
| ⋮ | ⋮ | ⋮ |
| $CMYK_N$ | $Lab_N$ | $\Delta E_N$ |

FIG. 27

| SETUP OF FILE SAVE | ☒ |
|---|---|

SET PARAMETER ASSOCIATED WITH SAVING OF FILE

DESIGNATE SAVING DESTINATION AND FILE NAME COLORIMETRIC VALUE AND HISTORY MANAGEMENT INFORMATION CAN BE SAVED AT THE SAME TIME, AND ARE OUTPUT TO SINGLE SAVING DESTINATION TOGETHER PROFILE. PRESS [NEXT] AFTER DESIGNATION

SAVING LOCATION (D):

[ /abc/ ]   [ REFER TO (R) ]

PROFILE NAME (P)   [ ddcp.icc ]

☑ EXPORT COLORIMETRIC VALUE (E)

FILE NAME:   [ .it8 ]

☑ SAVE HISTORY MANAGEMENT INFORMATION (U)

FILE NAME:   [ .pbh ]

[ BACK (B) ]  [ NEXT (N) ]  [ CANCEL ]

FIG. 28

```
┌─────────────────────────────────────────────────────────┐
│ SETUP OF HISTORY MANAGEMENT INFORMATION (1/3)        ☒  │
├─────────────────────────────────────────────────────────┤
│                                                         │
│   SET PARAMETERS ASSOCIATED WITH HISTORY MANAGEMENT     │
│   INFORMATION                                           │
│                                                         │
│   INPUT SITUATION UPON OUTPUTTING CHART, AND PRESS [NEXT]│
│                                                         │
│       OUTPUT DATE (D):    [JULY 27, 2000 ⇅] [CALENDAR (C)]│
│       OUTPUT OPERATOR (A):[ABC                       ▼] │
│       PRINTER (P):        [DDCP                      ▼] │
│       LOCATION (L):       [BUILDING A                ▼] │
│       PAPER·INK (E):      [DEDICATED PAPER           ▼] │
│       SAVING LOCATION (S):[LOCKER                    ▼] │
│                                                         │
│   ─────────────────────────────────────────────────     │
│                                                         │
│                     [ BACK (B) ] [ NEXT (N) ] [ CANCEL ]│
└─────────────────────────────────────────────────────────┘
```

FIG. 29

SETUP OF HISTORY MANAGEMENT INFORMATION (2/3)  ☒

SET PARAMETERS ASSOCIATED WITH HISTORY MANAGEMENT INFORMATION

INPUT SITUATION UPON COLORIMETRY, AND PRESS [NEXT]

| | |
|---|---|
| COLORIMETRY DATE (D): | JULY 27, 2000  [CALENDAR (C)] |
| COLORIMETRY OPERATOR (M): | BCD ▼ |
| COLORIMETRY DEVICE (O): | Type A ▼ |
| COLORIMETRY LIGHT SOURCE (I): | D50 ▼ |
| COLORIMETRY FIELD (A): | 2° ▼ |

[ BACK (B) ] [ NEXT (N) ] [ CANCEL ]

FIG. 30

```
SETUP OF HISTORY MANAGEMENT INFORMATION (3/3)                    ☒

SET PARAMETERS ASSOCIATED WITH HISTORY MANAGEMENT
  INFORMATION

INPUT SITUATION UPON BUILDING PROFILE, AND PRESS [NEXT]

OPERATOR (O): [CDE                              ▼]
    REMARKS (R):
    ┌────────────────────────────────────────┐
    │ DDCP PROFILE                         ▲ │
    │                                      ▓ │
    │                                      ▼ │
    │ ◄    ▓                             ►   │
    └────────────────────────────────────────┘

[ BACK (B) ] [ NEXT (N) ] [ CANCEL ]
```

FIG. 31

| C | M | Y | K | L* | a* | b* |
|---|---|---|---|---|---|---|
| 255 | 0 | 0 | 0 | 56.21 | -30.25 | -36.61 |
| 0 | 255 | 0 | 0 | 47.5 | 69.23 | -7.57 |
| 0 | 0 | 255 | 0 | 87.53 | -6.2 | 81.2 |
| 255 | 255 | 0 | 0 | 23.73 | 20.51 | -44.46 |
| 255 | 0 | 255 | 0 | 51.35 | -63.59 | 26.62 |
| 0 | 255 | 255 | 0 | 47.87 | 61.41 | 42.2 |
| 255 | 255 | 255 | 0 | 21.72 | 2.17 | 0.71 |
| 178.5 | 178.5 | 0 | 0 | 44.5 | 16.03 | -29.99 |
| 178.5 | 0 | 178.5 | 0 | 63.74 | -33.77 | 17.4 |
| 0 | 178.5 | 178.5 | 0 | 59.22 | 39.7 | 30.18 |
| 102 | 102 | 0 | 0 | 64.41 | 8.82 | -18.34 |
| 0 | 102 | 102 | 0 | 74.33 | 19.75 | 14.11 |
| 102 | 102 | 102 | 0 | 63.59 | 5.04 | -0.26 |
| 102 | 0 | 102 | 0 | 77.28 | -14.62 | 5 |
| 51 | 51 | 0 | 0 | 77.33 | 6.06 | -9.98 |
| 51 | 0 | 51 | 0 | 85.22 | -6.74 | 1.96 |
| ⋮ | | | | | | |
| 102 | 178.5 | 255 | 204 | 25.42 | 10.81 | 19.69 |
| 102 | 255 | 255 | 204 | 19.17 | 24.98 | 12.17 |
| 178.5 | 0 | 255 | 204 | 32.22 | -20.46 | 21.93 |
| 178.5 | 102 | 255 | 204 | 26.97 | -9.85 | 17.32 |
| 178.5 | 178.5 | 255 | 204 | 21.18 | 2.34 | 12.41 |
| 178.5 | 255 | 255 | 204 | 15.76 | 15.66 | 6.01 |
| 255 | 0 | 255 | 204 | 26.77 | -38.66 | 12.94 |
| 255 | 102 | 255 | 204 | 21.28 | -26.44 | 8.82 |
| 255 | 178.5 | 255 | 204 | 16.41 | -15.69 | 3.69 |
| 255 | 255 | 255 | 204 | 1057 | 0.72 | -0.36 |

FIG. 32

| | |
|---|---|
| <PROFILE GENERATIN HISTORY> | |
| [PROFILE NAME] | "/abc/ddcp.icc!" |
| [PROFILE GENERATION HISTORY FILE NAME] | "/abc/ddcp.pbh" |
| [COLORIMETRIC VALUE FILE NAME] | "/abc/ddcp.it8" |
| [COLOR CHART OUTPUT DATE] | "JULY 27, 2000" |
| [COLOR CHART OUTPUT OPERATOR] | "ABC" |
| [PRINTER NAME] | "DDCP" |
| [PRINTER LOCATION] | "BUILDING A" |
| [TYPE OF PEPER·INK] | "DEDICATED PAPER" |
| [SAVING LOCATION OF COLOR CHART] | "LOCKER" |
| [COLORIMETRY DATE] | "JULY 27, 2000" |
| [COLORIMETRY OPERATOR] | "BCD" |
| [COLORIMETRY DEVICE] | "Type A" |
| [COLORIMETRIC LIGHT SOURCE] | "D50" |
| [COLORIMETRIC FIELD] | "2" |
| [COLORIMETRIC COLOR SPACE] | "L*a*b*" |
| [COLOR CHART] | "CMYK IT8 (FOR A4 DOCUMENT TABLE)" |
| | "AUGUST 22, 2000" |
| [PROFILE GENERATION DATE] | "CDE" |
| [PROFILE CREATOR] | "DDCP PROFILE" |
| [REMARKS] | "ON" |
| [WHITE POINT CORRECTION OF COLORIMETRIC VALUE] | "OFF" |
| [SMOOTHING OF COLORIMETRIC VALUE] | |
| [SETUP OF SOURCE LOOKUP TABLE (A2Bx)] | "SIZE PRECISION" |
|    [OPTIMIZATION] | "OFF" |
|    [SMOOTHING OF TABLE] | "8-BIT PRECISION" |
|    [TABLE PRECISION] | |
| [SETUP OF DESTINATION LOOKUP TABLE (B2Ax)] | "SIZE PRECISION" |
|    [OPTIMIZATION] | "OFF" |
|    [SMOOTHING OF TABLE] | "8-BIT PRECISION" |
|    [TABLE PRECISION] | "DDCP" |
| [DESCRIPTION] | "200%" |
| [SECONDARY COLOR OVERLAY] | "400%" |
| [QUARTIC COLOR OVERLAY] | "1.8" |
| [GAMMA] | |

FIG. 40

| USER | MANU-FACTURER ID | MODEL ID | ATTRIBUTES | CREATOR ID | PROFILE VERSION | BUILD NUMBER | ... | COLOR-IMETRIC VALUE ID | WHITE POINT CORREC-TION | SECONDARY COLOR OVERLAY |
|---|---|---|---|---|---|---|---|---|---|---|
| Taro | CANO | C0000 | 00000000 | CANO | 1 | 0 | | 1 | ON | 200% |
| Taro | CANO | C0000 | 00000000 | CANO | 1 | 1 | | 1 | ON | 180% |
| Taro | CANO | C0000 | 00000000 | CANO | 2 | 0 | | 2 | ON | 180% |
| Taro | CANO | C0000 | 00000000 | CANO | 3 | 0 | | 3 | ON | 180% |
| ... | | | | | | | | | | |
| Jiro | CANO | B0000 | 00000001 | CANO | 1 | 0 | | 4 | ON | 165% |
| ... | | | | | | | | | | |

FIG. 41

| COLORIMETRIC VALUE ID | CHART OUTPUT DATE | COLORIMETRY DATE | COLORIMETRIC LIGHT SOURCE | COLORIMETRIC FIELD | COLORIMETRIC COLOR SPACE | COLORIMETRIC VALUE DATA | COMMENT |
|---|---|---|---|---|---|---|---|
| 1 | 4/10/2001 | 4/10/2001 | D50 | 2° | Lab | <array> | Measured |
| 2 | 5/13/2001 | 5/20/2001 | D50 | 2° | Lab | <array> | Measured |
| 3 | 6/15/2001 | 6/15/2001 | D50 | 2° | Lab | <array> | Ave (1,2) |
| 4 | 9/18/2001 | 9/19/2001 | D50 | 2° | Lab | <array> | Measured |

IMAGE PROCESSING METHOD AND APPARATUS, AND PROFILE MANAGEMENT METHOD

This application is a divisional application of co-pending application Ser. No. 11/223,953, filed Sep. 13, 2005, which was a divisional application of U.S. application Ser. No. 09/948,604, filed Sep. 10, 2001, now U.S. Pat. No. 7,035,454, which issued Apr. 25, 2006 each of which are incorporated herein by reference.

FIELD OF THE INVENTION

The present invention relates to an image processing apparatus and method, profile regeneration timing estimation method, color difference variation display method, and profile management method and, more particularly, to a color reproduction process of a printer.

BACKGROUND OF THE INVENTION

As a color correction scheme for improving the color reproduction effect in a color reproduction process of a printer and printing press, a method of converting data of an input color space into data of an output color space by a color masking method that obtains data of the output color space via matrix operations of data of the input color space is prevalently used.

However, the output characteristics of a color printer and printing press show strong nonlinearity. Therefore, a global method such as a color masking method, i.e., a color correction method in which a change in matrix element influences the entire output color space, cannot sufficiently approximate the characteristics of the color printer and printing press in all color ranges.

SUMMARY OF THE INVENTION

It is an object of the present invention to provide a profile which can precisely approximate strong nonlinear output characteristics of a color printer and printing press, and allows precise color reproduction, and to manage the generation history of the generated profile.

In order to achieve the above object, a preferred embodiment of the present invention discloses an image processing method of generating a profile of a device, comprising the steps of: storing a generated profile in a predetermined memory area; and storing various conditions upon generating the profile in a history management memory area.

It is another object of the present invention to manage colorimetric values used in generation of a profile.

In order to achieve the above object, a preferred embodiment of the present invention discloses the step of providing a user interface which is used to save the various conditions together with the generated profile.

It is still another object of the present invention to estimate the regeneration timing of a profile.

In order to achieve the above object, a preferred embodiment of the present invention discloses an estimating method of estimating a profile regeneration timing of a device, comprising the steps of: reading colorimetry histories of a device, which include colorimetric values and time stamps of different timings, from a memory area; estimating a profile regeneration timing from the read time-serial colorimetry histories; and outputting information to inform arrival of the estimated regeneration timing.

It is yet another object of the present invention to integrally manage the profile generation history, colorimetric value data, and the like in a database.

In order to achieve the above object, a preferred embodiment of the present invention discloses a computer program product comprising a computer readable medium storing a computer program code, for an estimating method of estimating a profile regeneration timing of a device, comprising process procedure code for: reading colorimetry histories of a device, which include at least colorimetric values and time stamps of different timings, from a memory area designated by a user; estimating a profile regeneration timing from the read time-serial colorimetry histories; and outputting information to inform arrival of the estimated regeneration timing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 shows an example of an RGB to Lab conversion table;

FIG. 21 is a table that stores standard colorimetric values;

FIGS. 27 to 30 show user interfaces associated with history management;

FIG. 31 shows an example of a list of colorimetric values to be saved;

FIG. 32 shows an example of history management information to be saved;

FIG. 40 is a project table stored in the project DB; and

FIG. 41 is a measurement table stored in the colorimetric value DB.

DESCRIPTION OF THE PREFERRED EMBODIMENTS

An image processing apparatus according to an embodiment of the present invention will be described hereinafter with reference to the accompanying drawings.

First Embodiment

[Arrangement]

Figure 1:
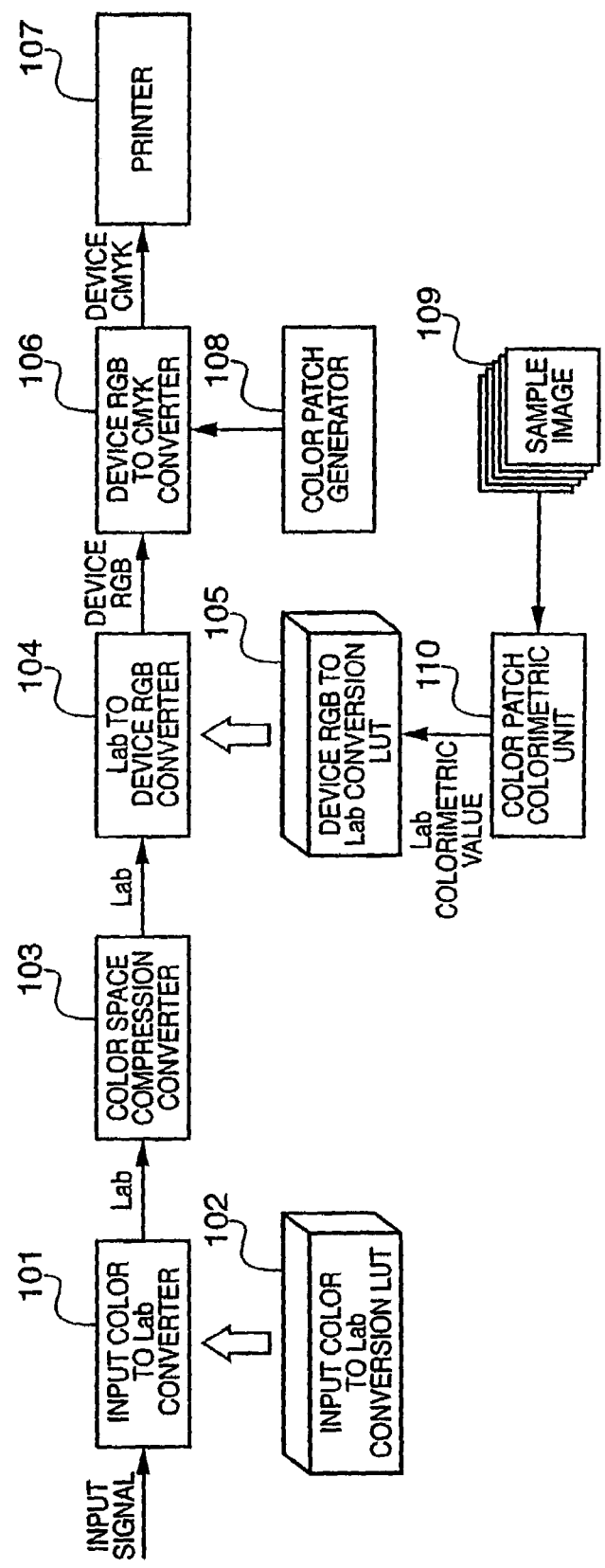
FIG. 1 is a block diagram showing the arrangement of an image processing apparatus of the first embodiment.

FIG. 1 is a block diagram showing the arrangement of an image processing apparatus of this embodiment.

A signal input to the image processing apparatus shown in FIG. 1 is an image signal of a color space depending on a given device, and may be an RGB signal which represents an image read from a document by a given scanner or a CMYK signal to be output to a given printer. When the first embodiment is applied to a copying machine, the input signal is an RGB signal that represents an image read by a scanner. When this embodiment is applied to proof (test print, calibration print), the input signal is a CMYK signal to be output to a printing press as a target.

Such input signal is input to an input color to Lab converter 101, and is converted into a signal of an Lab color space as a device-independent color space. This conversion is implemented by LUT conversion using an input color to Lab conversion LUT 102.

In the input color to Lab conversion LUT 102, a table corresponding to the color space of an input signal must be set. For example, when an image signal that depends on the RGB color space of scanner A is input, a three-dimensional input—three-dimensional output RGB to Lab conversion table that represents the correspondence between RGB values depending on the RGB color space of scanner A and Lab values is set as a table of the input color to Lab conversion LUT 102. Likewise, when an image signal depending on the CMYK color space of printer B is input, a four-dimensional input—three-dimensional output CMYK to Lab conversion table that represents the correspondence between CMYK values depending on the color space of printer B, and Lab values is set as a table of the input color to Lab conversion LUT 102.

Figure 2:
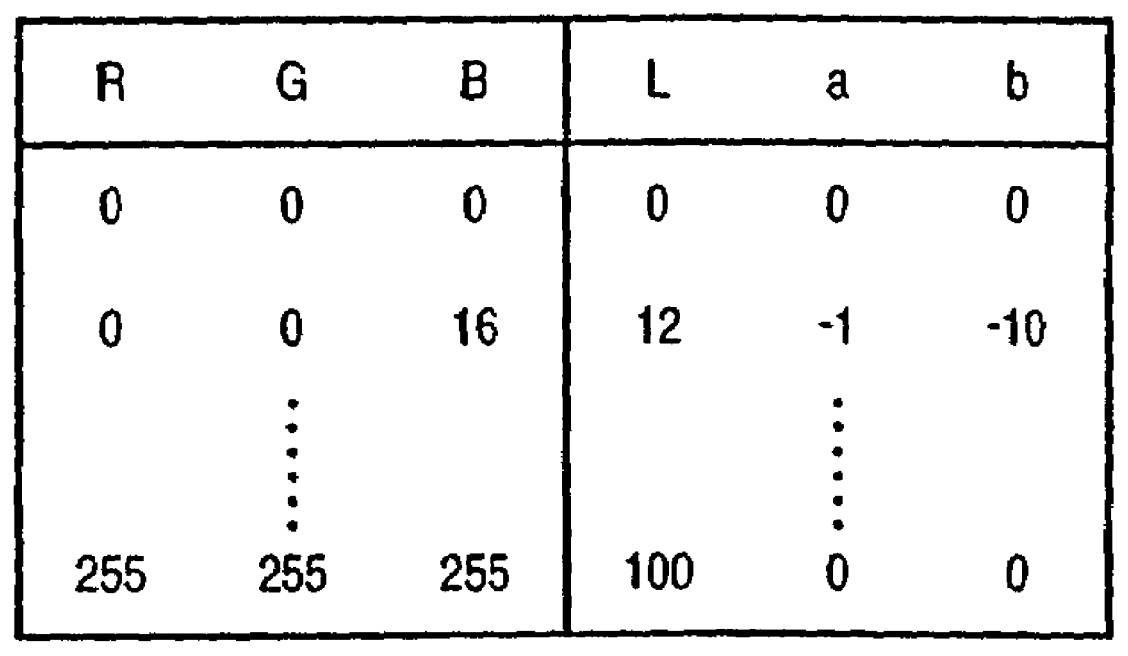

FIG. 2 shows an example of the RGB to Lab conversion table, and shows the correspondence between 8-bit RGB values and Lab values. Since an actual table stores Lab values having representative RGB values as addresses, the input color to Lab converter 101 reads out Lab values near input RGB values from the table, and acquires Lab values corresponding to the input RGB values by interpolating using the readout Lab values.

An Lab signal output from the input color to Lab converter 101 is converted into a signal in a device RGB color space by an Lab to device RGB converter 104 on the basis of a device RGB to Lab conversion LUT 105. This process will be described in detail later.

When the color space of an input signal is an RGB color space, its color range is often broader than the color reproduction range of a printer. For this reason, the Lab signal output from the input color to Lab converter 101 is mapped in a color reproduction range of a printer 107 (by gamut mapping) by a color space compression converter 103, and is then input to the Lab to device RGB converter 104. As a practical method of gamut mapping, a method of performing a color space compression process in a uniform color space disclosed in Japanese Patent Laid-Open No. 8-130655, or the like may be used.

A signal of the device RGB color space, which is output from the Lab to device RGB converter 104 is converted into a signal of a CMYK color space depending on the printer 107 by a device RGB to CMYK converter 106, and the converted signal is sent to the printer 107. As for RGB to CMYK conversion, various methods are available, and a method to be used is not particularly limited. For example, the following conversion equations are used:

$$C=(1.0-R)-K$$

$$M=(1.0-G)-K$$

$$Y=(1.0-B)-K$$

$$K=\min\{(1.0-R),(1.0-G),(1.0-B)\}$$

[Lab to Device RGB Conversion]

The Lab to device RGB converter 104 will be described in detail below.

Figure 3:
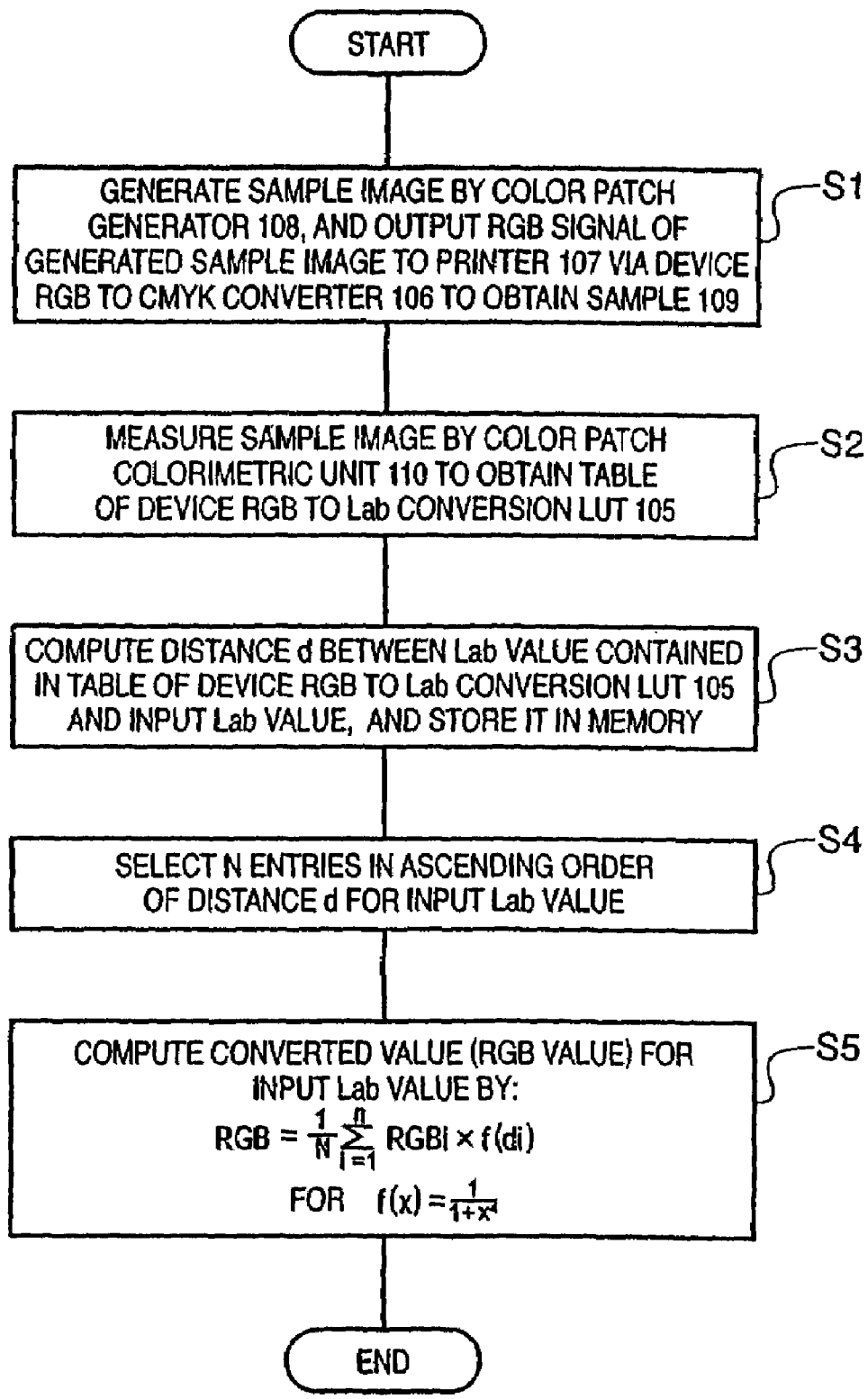
FIG. 3 is a flow chart showing the sequence for executing Lab to device RGB conversion by obtaining the correspondence between device RGB values and Lab colorimetric values.

The Lab to device RGB converter 104 converts a signal on the basis of the correspondence between device RGB values obtained in advance, and Lab colorimetric values. FIG. 3 is a flow chart showing the sequence for executing Lab to device RGB conversion by obtaining the correspondence between device RGB values and Lab colorimetric values. Of course, when the correspondence between device RGB values and Lab colorimetric values are already obtained, steps S1 and S2 are skipped.

Step S1

Figure 4:
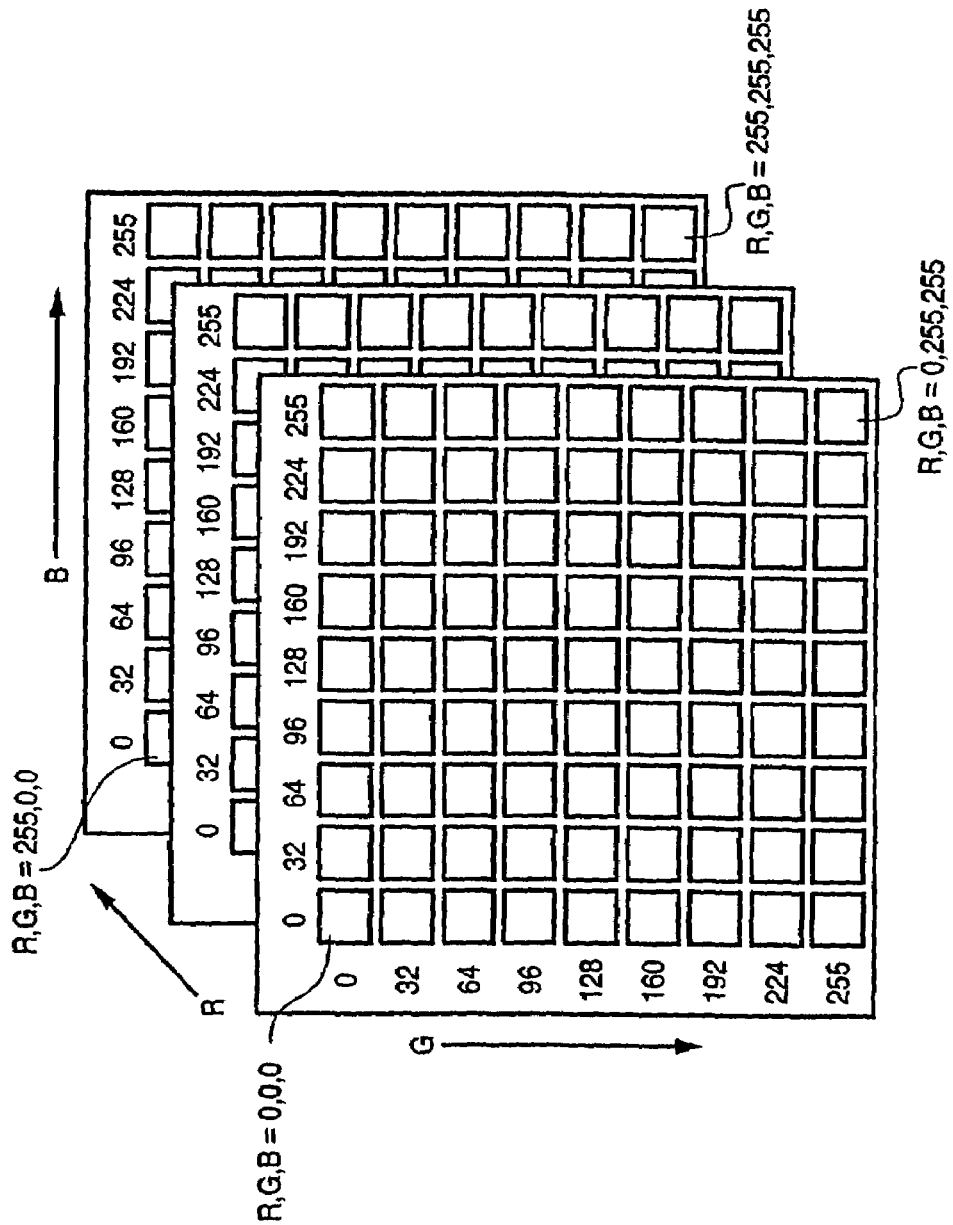
FIG. 4 shows an example of a sample image.

A color patch generator 108 generates a sample image consisting of a plurality of color patches, as shown in FIG. 4. An RGB signal of the generated sample image is output to the printer 107 via the device RGB to CMYK converter 106 to obtain a sample image 109.

The sample image is generated by the color patch generator 108 to uniformly divide the device RGB color space. In the example shown in FIG. 4, an RGB color space specified by 8 bits per each of R, G, and B is uniformly divided into 9×9×9 to obtain 729 patches. Normally, a color space depending on the printer 107 is a CMYK color space. However, since the RGB color space can be converted into a CMYK color space by a conversion rule, the RGB color space is considered as a color space which depends on the printer 107.

Step S2

Figure 5:
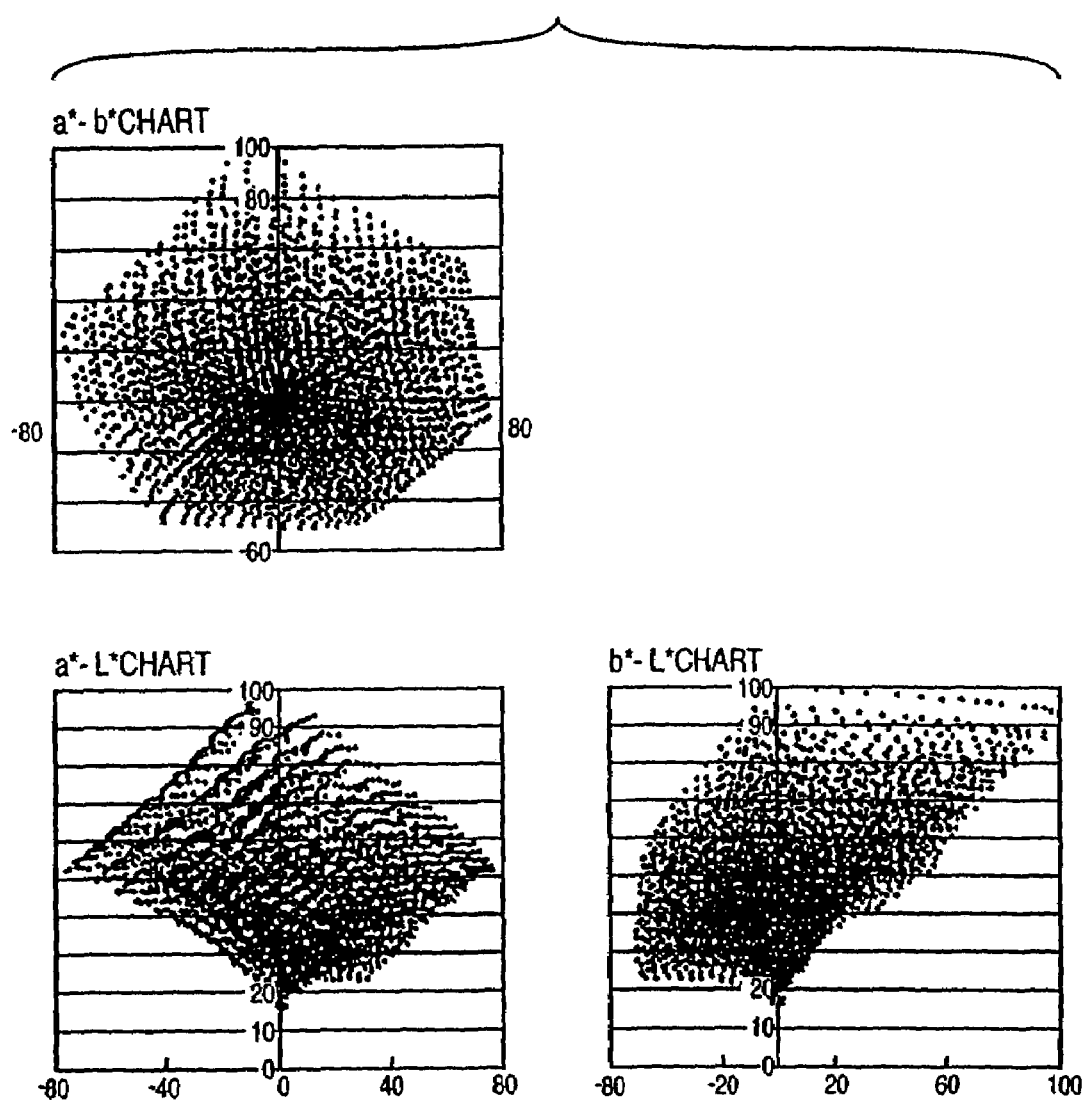
FIG. 5 shows an example of the colorimetric results of a color patch colorimetric unit.

Color patches of the sample image 109 are measured by a color patch colorimetric unit 110 to obtain Lab colorimetric values of the respective color patches. The obtained Lab colorimetric values are distributed on an Lab color space, as shown in FIG. 5. With this operation, RGB values generated by the color patch generator 108 and Lab colorimetric values measured by the color patch colorimetric unit 110 are obtained, thus obtaining a table of the device RGB to Lab conversion LUT 105. Using this device RGB to Lab conversion LUT 105, Lab to device RGB conversion is done.

When an LUT is used, known interpolation operations such as cube interpolation, tetrahedron interpolation, and the like are used. In these interpolation operations, grids corresponding to the input side of the LUT must have an equal interval. The device RGB values in the table of the device RGB to Lab conversion LUT 105 are equally spaced apart, but Lab colorimetric values are not. For this reason, when Lab values are input, the table of the device RGB to Lab conversion LUT 105 does not form an LUT having grids at an equal interval. Therefore, an interpolation operation that inputs Lab values cannot be simply made. For this reason, Lab to device RGB conversion is done in the following sequence.

Step S3

Distances d (equivalent to color differences obtained by Lab color difference equations) between Lab values included in the table of the device RGB to Lab conversion LUT 105, and the input Lab value are computed and are stored in a memory.

Step S4

Figure 6:
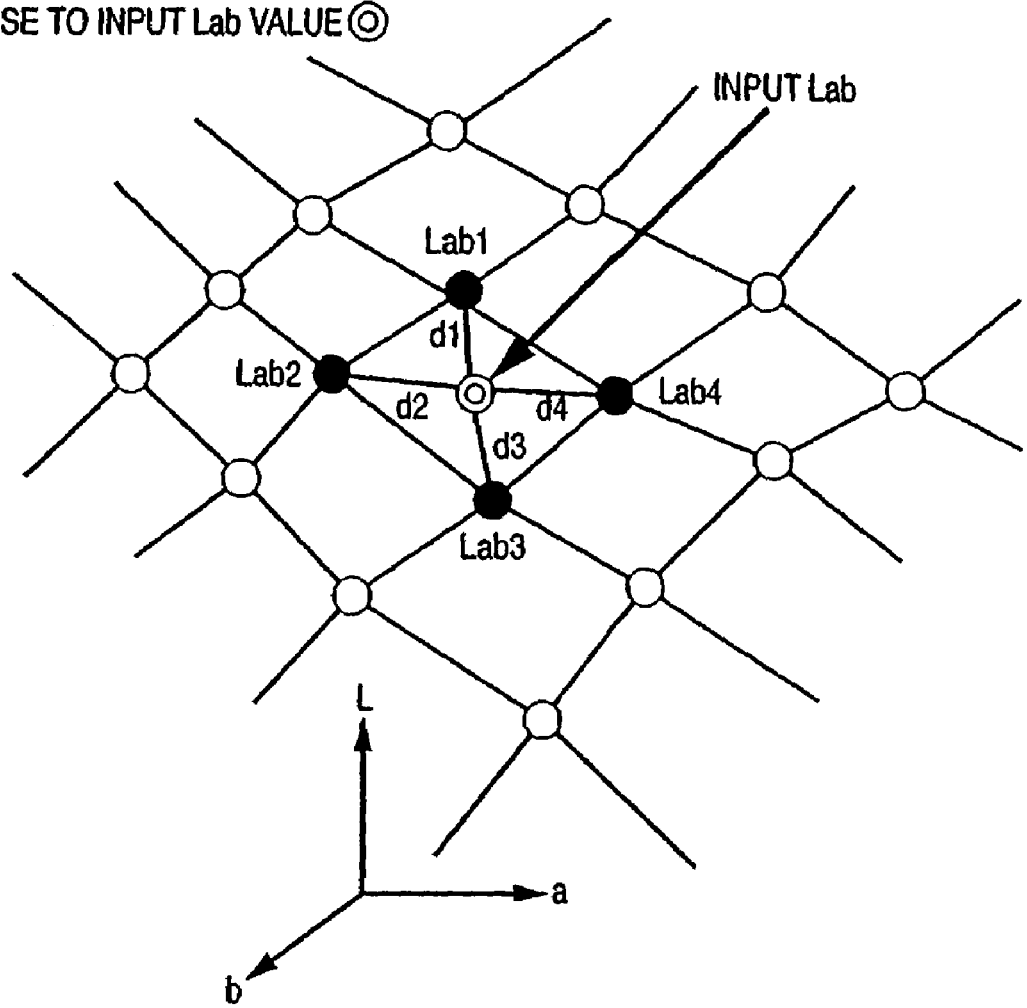
FIG. 6 is a view for explaining selection of sample points.

As shown in FIG. 6, N entries (●) in ascending order of distance d are selected for an input Lab value (◎). At this time, the entries are described as follows in ascending order of distance d.

| RGB Value | Lab Colorimetric Value | Distance |
|---|---|---|
| $RGB_1$ | $Lab_1$ | $d_1$ |
| $RGB_2$ | $Lab_2$ | $d_2$ |
| $RGB_3$ | $Lab_3$ | $d_3$ |
| . | . | . |
| . | . | . |
| . | . | . |
| $RGB_N$ | $Lab_N$ | $d_N$ | for $d_1 < d_2 < d_3 < \ldots < d_N$

Step S5

A converted value (RGB value) corresponding to the input Lab value is computed by:

$$RGB = (1/N) \times \Sigma_{i=1}^{N} RGBi \times f(di)$$

for $f(x) = 1/(1+x^4)$

Figure 7:
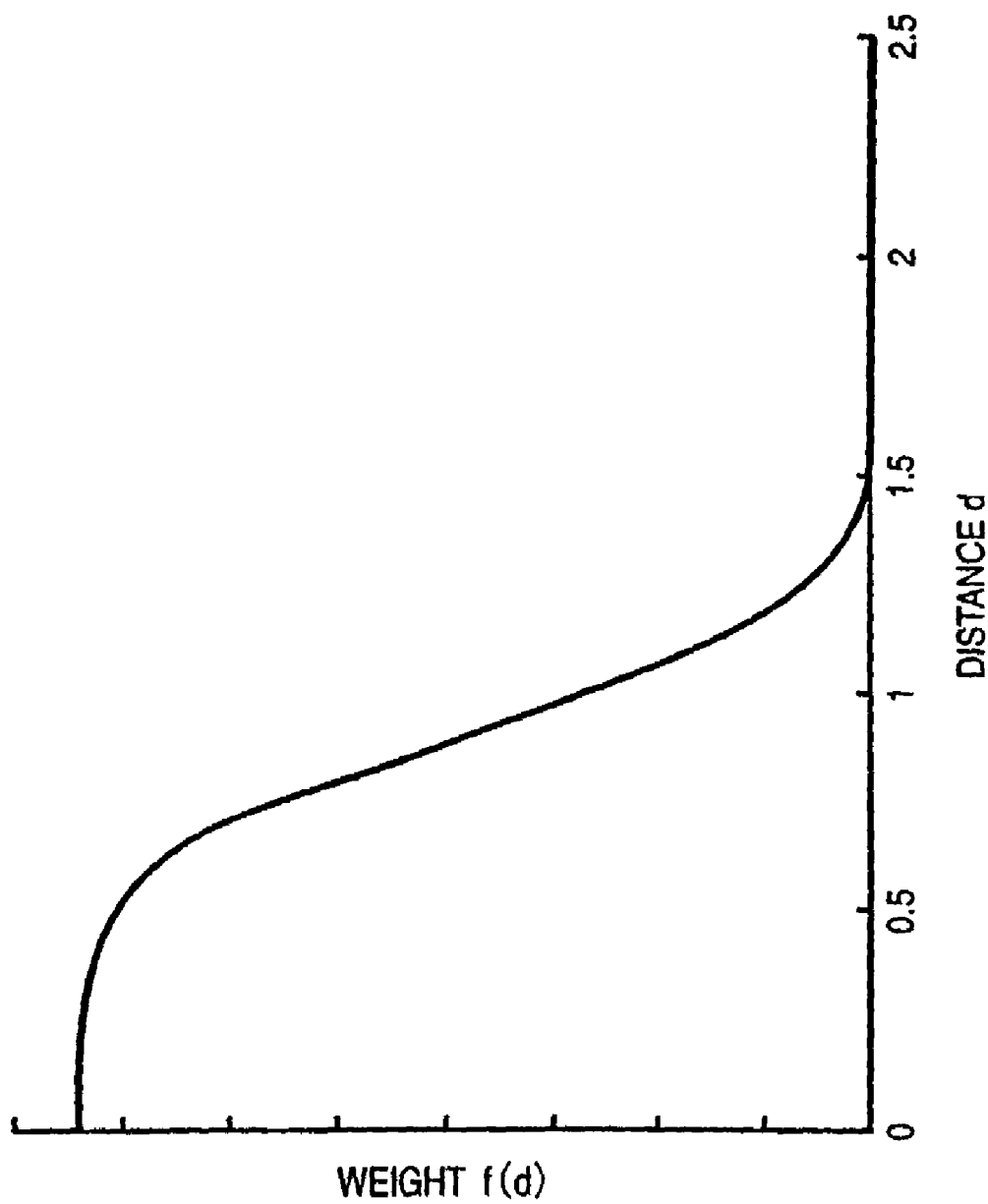
FIG. 7 is a graph for explaining a weighting function according to a distance d.

Since a function f(x) has characteristics shown in FIG. 7, the computation of the above equation is equivalent to an interpolation operation made on the Lab color space by multiplying an RGB value corresponding to a closer Lab colorimetric value by a larger weight.

The number N of sample points used in the interpolation operation can be set to be a constant (e.g., 8) in the entire Lab color space. However, since colorimetric values are concentrated on a region with a lower lightness value L*, as shown in FIG. 5, depending on the conversion scheme adopted in the device RGB to CMYK converter 106, a problem may be posed if N is set to be a constant. That is, since the distance d becomes very small in the region where the colorimetric values are concentrated, if N is small, an interpolation operation is made by multiplying a small number of sample points by a large weight, and problems such as tone jump in the RGB color space, abnormal white balance in a low-lightness region, and the like readily take place.

Figure 8:
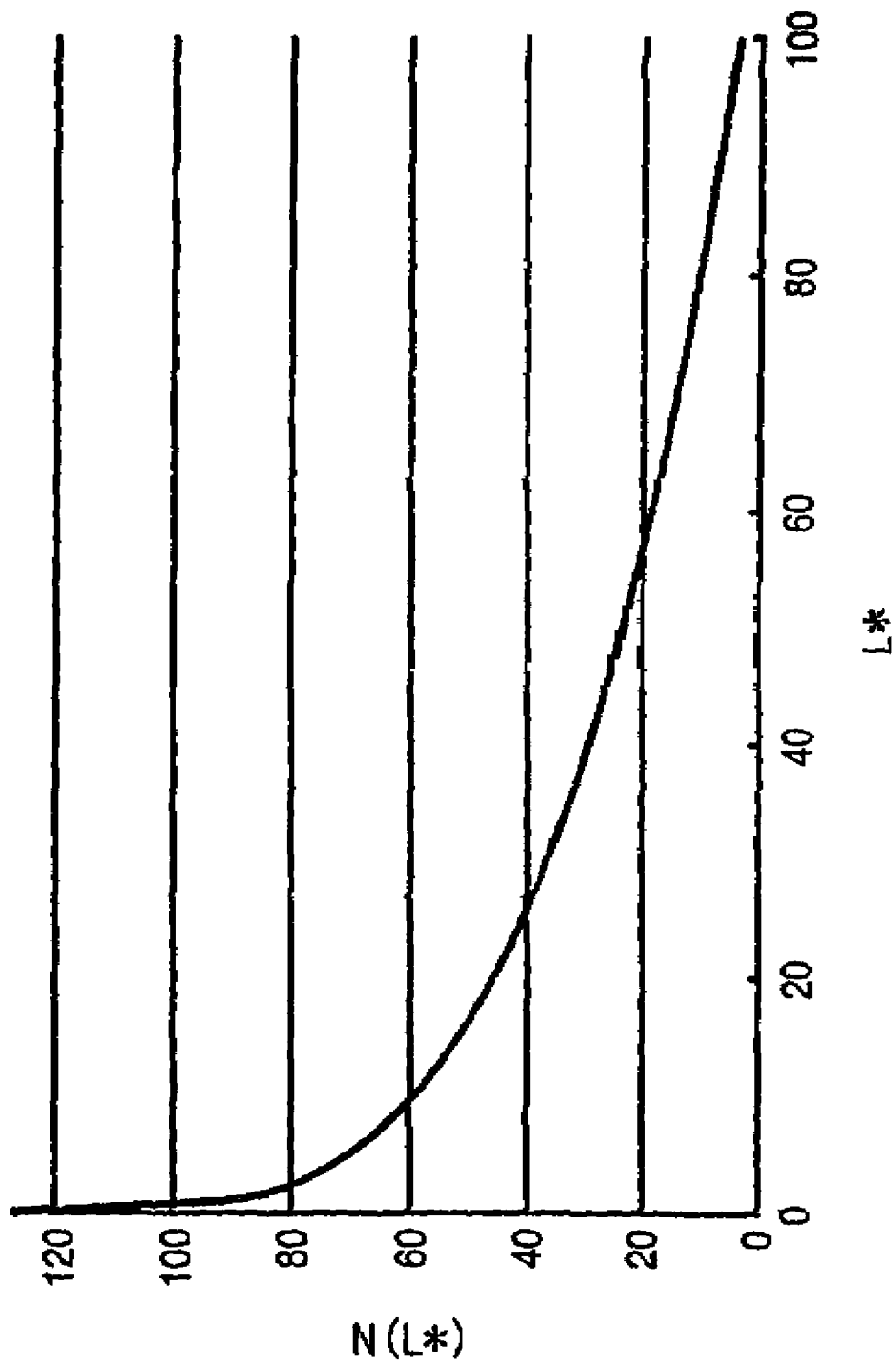
FIG. 8 is a graph for explaining a function for changing the number of sample points.

These problems can be effectively solved by interpolating while changing the number of sample points in correspondence with an L* value of the input Lab value, as shown in FIG. 8. Of course, even in a high-lightness region, the number of sample points used in the interpolation operation is limited and turbidity or the like is hard to occur. Note that the example of a function N(L*) shown in FIG. 8 indicates a (¼)-th power function that yields 128 when L*=0, and 4 when L*=100.

By repeating the processes in steps S3 to S5 for all input Lab values, an Lab signal can be converted into a device RGB signal.

Second Embodiment

An image processing apparatus according to the second embodiment of the present invention will be explained below. Note that the same reference numerals in this embodiment denote the same parts as in the first embodiment, and a detailed description thereof will be omitted.

Figure 9:
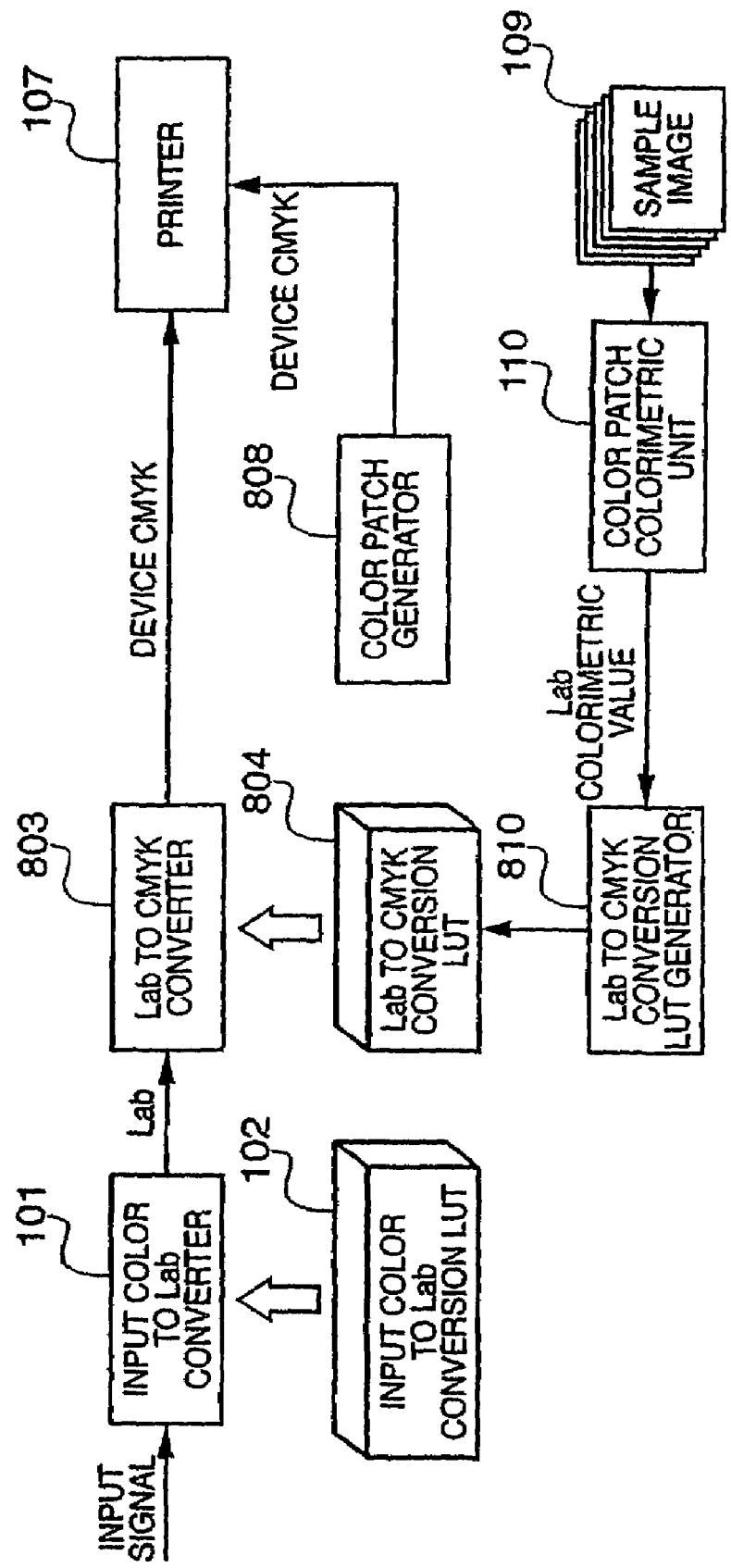
FIG. 9 is a block diagram showing the arrangement of an image processing apparatus of the second embodiment.

FIG. 9 is a block diagram showing the arrangement of the image processing apparatus of the second embodiment. The image processing apparatus of the second embodiment is different from that of the first embodiment in that a signal of a device-independent color space is converted into a signal of a color space of the printer 107 using an LUT in the same manner as in a case wherein an input signal is converted into a signal of a device-independent color space.

An Lab to CMYK converter 803 converts an Lab signal into a signal of a CMYK color space which depends on the printer 107 using an Lab to CMYK conversion LUT 804. The CMYK signal output from the Lab to CMYK converter 803 is sent to the printer 107. The Lab to CMYK conversion LUT 804 is prepared as follows.

A CMYK signal of a sample image generated by a color patch generator 808 is output to the printer 107 to obtain a sample image 109.

The color patch colorimetric unit 110 measures color patches of the obtained sample image 109 to obtain Lab colorimetric values of the respective color patches. A CMYK to Lab conversion LUT is generated on the basis of the obtained Lab colorimetric values and the CMYK values generated by the color patch generator 808. Based on the generated CMYK to Lab conversion LUT, the Lab to CMYK conversion LUT 804 is generated using the same method as in the first embodiment.

For example, if an Lab value is an 8-bit signal, an L* value ranges from 0 to 255, and a* and b* values range from −128 to 127. When Lab grids are formed by segmenting the Lab ranges into 16 steps, a table of the CMYK to Lab conversion LUT 804 can be generated by 4913 ($=17^3$) calculations.

In the first embodiment, the Lab color space is converted into the device RGB color space using an LUT, and the device RGB color space is converted into the CMYK color space by an arithmetic process. In the second embodiment, these conversion processes can be done by a single LUT, thus achieving efficient conversion processes.

Third Embodiment

An image processing apparatus according to the third embodiment of the present invention will be described below. Note that the same reference numerals in this embodiment denote the same parts as in the first embodiment, and a detailed description thereof will be omitted.

Figure 10:
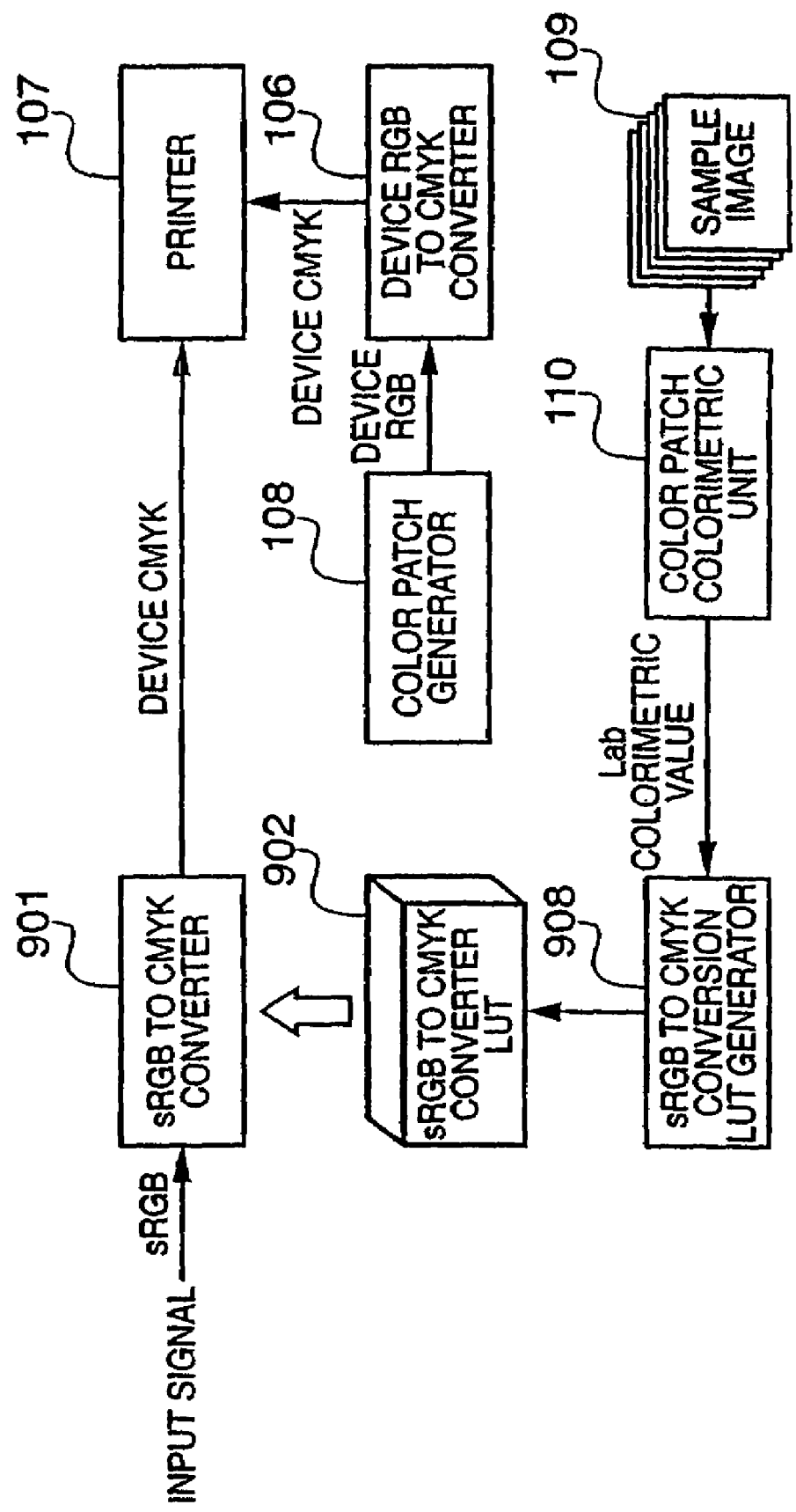
FIG. 10 is a block diagram showing the arrangement of an image processing apparatus of the third embodiment.

FIG. 10 is a block diagram showing the arrangement of the image processing apparatus of the third embodiment, which has an arrangement for inputting an input signal of an sRGB color space that becomes a standard color space in the Internet in recent years. The sRGB color space has specific correspondence with an XYZ color space, and can be considered as a device-independent color space. Hence, when an sRGB value is converted into an XYZ or Lab value, and then undergoes the aforementioned conversion from the Lab color space into a printer color space, the printer 107 can reproduce an image expressed by the signal of the SRGB color space.

Referring to FIG. 10, an sRGB to CMYK converter 901 converts an input signal of the sRGB color space into a signal of the CMYK color space that depends on the printer 107 using an sRGB to CMYK conversion LUT 902. The CMYK signal output from the sRGB to CMYK converter 901 is sent to the printer 107. The sRGB to CMYK conversion LUT 902 is generated as follows.

An RGB signal of a sample image generated by the color patch generator 108 is converted into a CMYK signal that depends on the printer 107 by the device RGB to CMYK converter 106, and the converted CMYK signal is output to the printer 107, thus obtaining a sample image 109.

The color patch colorimetric unit 110 measures respective color patches of the obtained sample image 109 to obtain Lab colorimetric values of the color patches. An sRGB to CMYK conversion LUT generator 908 generates a table of the sRGB to CMYK conversion LUT 902 on the basis of the obtained Lab colorimetric values and the RGB values generated by the color patch generator 108.

The process of the sRGB to CMYK conversion LUT generator 908 generates a table of the sRGB to CMYK conversion LUT 902 on the basis of CMYK values obtained by applying the device RGB to CMYK conversion process explained in the first embodiment to RGB values generated by the color patch generator 108, and sRGB values obtained by applying Lab to XYZ and XYZ to sRGB conversions according to definition equations to Lab colorimetric values. For example, if an sRGB signal is an 8-bit signal, when 17×17×17 sRGB grids are formed by segmenting respective sRGB ranges into 16 steps, a table of the sRGB to CMYK conversion LUT 902 can be generated by 4913 (=$17^3$) calculations.

According to the embodiments mentioned above, a color conversion method which can precisely approximate strong nonlinear output characteristics of a color printer and printing press and can realize high-precision color reproduction can be provided. Therefore, since color space conversion that satisfactorily reflects the characteristics of a printer and printing press is done in the device-independent color space, the printer and printing press can achieve high-precision color reproduction independently of the input color space.

In the above embodiment, the Lab color space has been exemplified as the device-independent color space. However, other uniform color spaces, e.g., an Luv color space may be used to obtain the same effects.

Fourth Embodiment

In the above embodiments, the output device profile generation method has been explained. The device value (e.g., CMYK) to Lab conversion LUT explained in each embodiment corresponds to a destination profile (BtoA0) 1101D of an output device shown in FIG. 12, and the Lab to device value (e.g., CMYK) conversion LUT corresponds to a source profile (AtoB0) 1101S of an output device shown in FIG. 12.

In some cases, an image that has been color-converted in correspondence with the output characteristics of a printing press as a target for the purpose of proof (test print, calibration print) is printed by a copying machine or printer. To attain such proof, sample image data is supplied to an output device used in the proof to make that device print a sample image by the method explained in the above embodiments, and a profile must be generated based on colorimetric values of color patches of the obtained sample image. An image that has undergone color conversion using the generated profile is printed by the output device.

An embodiment in which a profile of an output device used in proof is generated, and the processing result using the generated profile can be confirmed will be explained as the fourth embodiment. Note that the profile generated by the method explained in the fourth embodiment is not limited to that for proof, and can be used in a normal output (print) process.

[Arrangement of Color Conversion Module]

Figure 11:
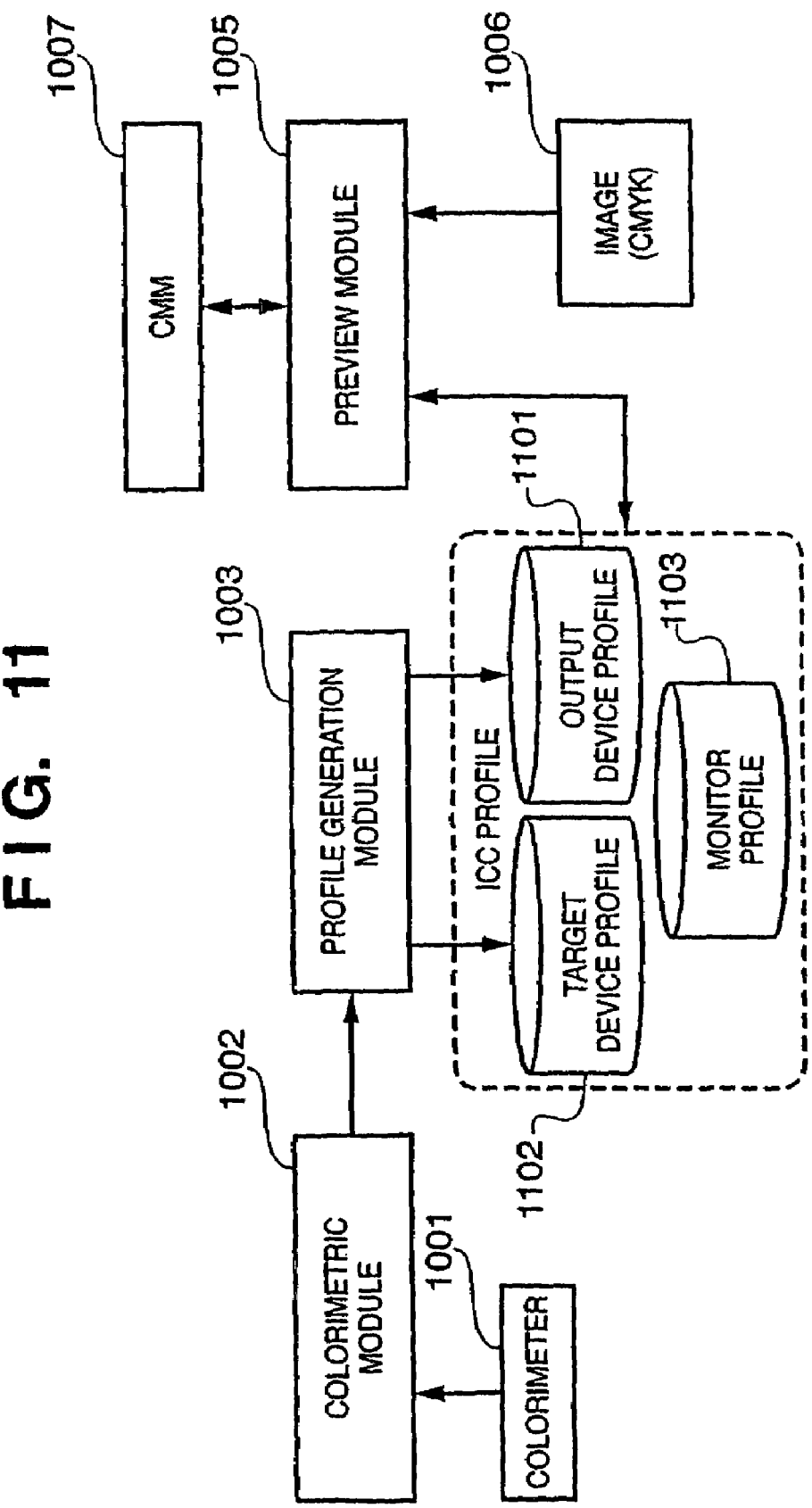
FIG. 11 is a block diagram showing the arrangement of a color conversion module of the fourth embodiment.

An outline of the arrangement for making color conversion using a profile will be explained first. FIG. 11 is a block diagram showing the arrangement of a color conversion module.

A colorimeter (spectrophotometer) 1001 and colorimetric module 1002 measure color patches of a sample image (e.g., a standard IT8 or 4320 CMYK image) printed by an output device. The colorimetric result is supplied to a profile generation module 1003 on-line or off-line, which generates a profile 1101D (Lab to CMYK conversion LUT: BtoA0) and profile 1101S (device value to Lab conversion LUT: AtoB0) as output device profiles according to the definitions of ICC (International Color Consortium) by the method explained in the above embodiments.

A preview module 1005 supplies (or instructs) an image 1006 to be proofed, a profile (target device value to Lab conversion LUT) 1102 corresponding to a target device, the profiles 1101D and 1101S of the output device, and a monitor profile 1103 to a color management module (CMM) 1007 to make it color-convert the image 1006.

In the fourth embodiment, the profiles are generated using the same method as in the above embodiment. Functions in the fourth embodiment that improve user's convenience will be explained in detail below.

[Colorimetric Process]

The color conversion module shown in FIG. 11 is supplied as software to, e.g., a personal computer and is implemented. The user can instruct execution of the colorimetric process via a user interface displayed on a monitor 1004.

Figure 14:
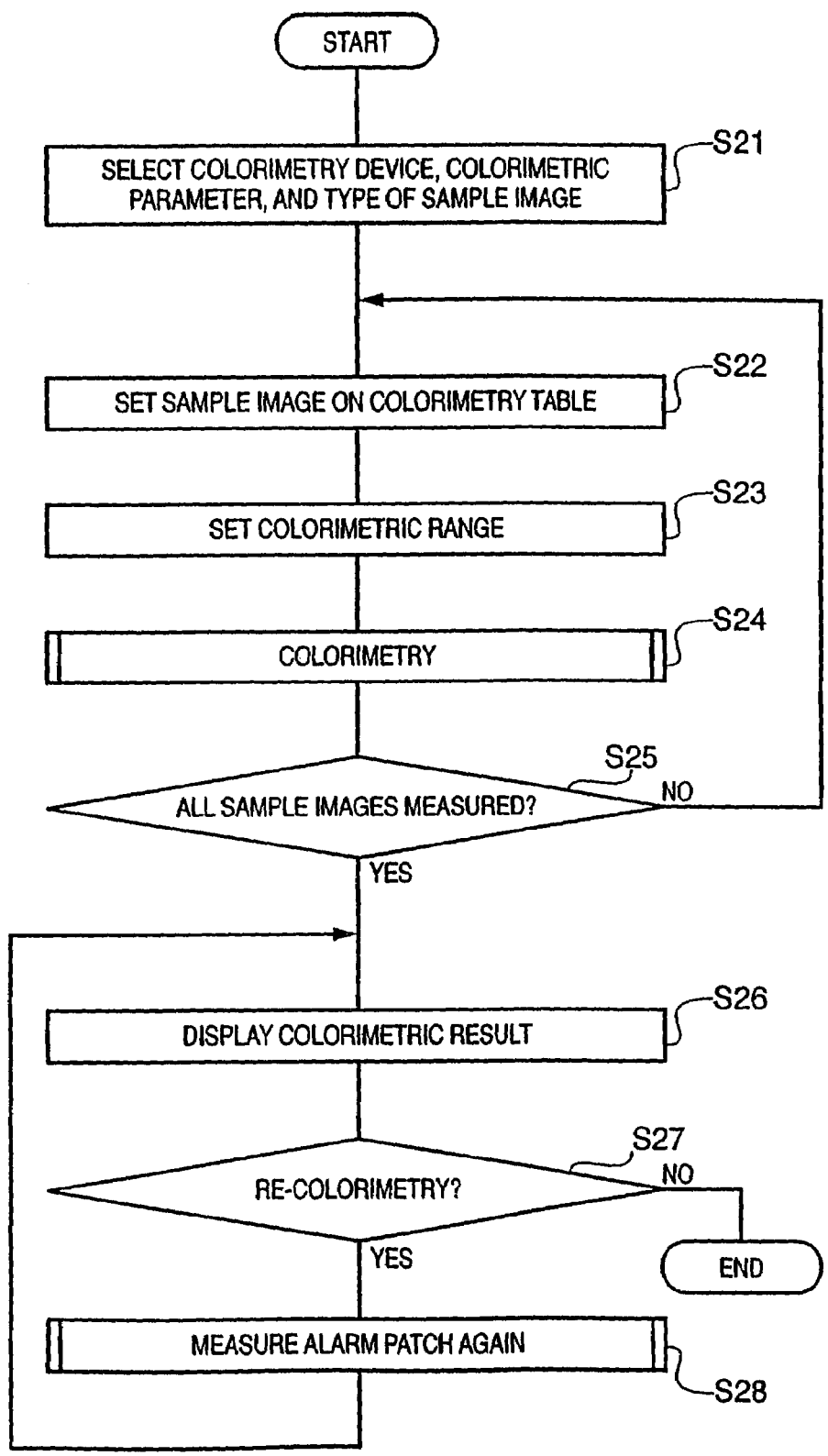
FIG. 14 is a flow chart. showing a colorimetric sequence.

FIG. 14 is a flow chart showing the colorimetric sequence, which is executed by the profile generation module 1003 shown in FIG. 11. This colorimetric process corresponds to the process of the color patch colorimetric unit 110 shown in FIG. 9.

Figure 15:
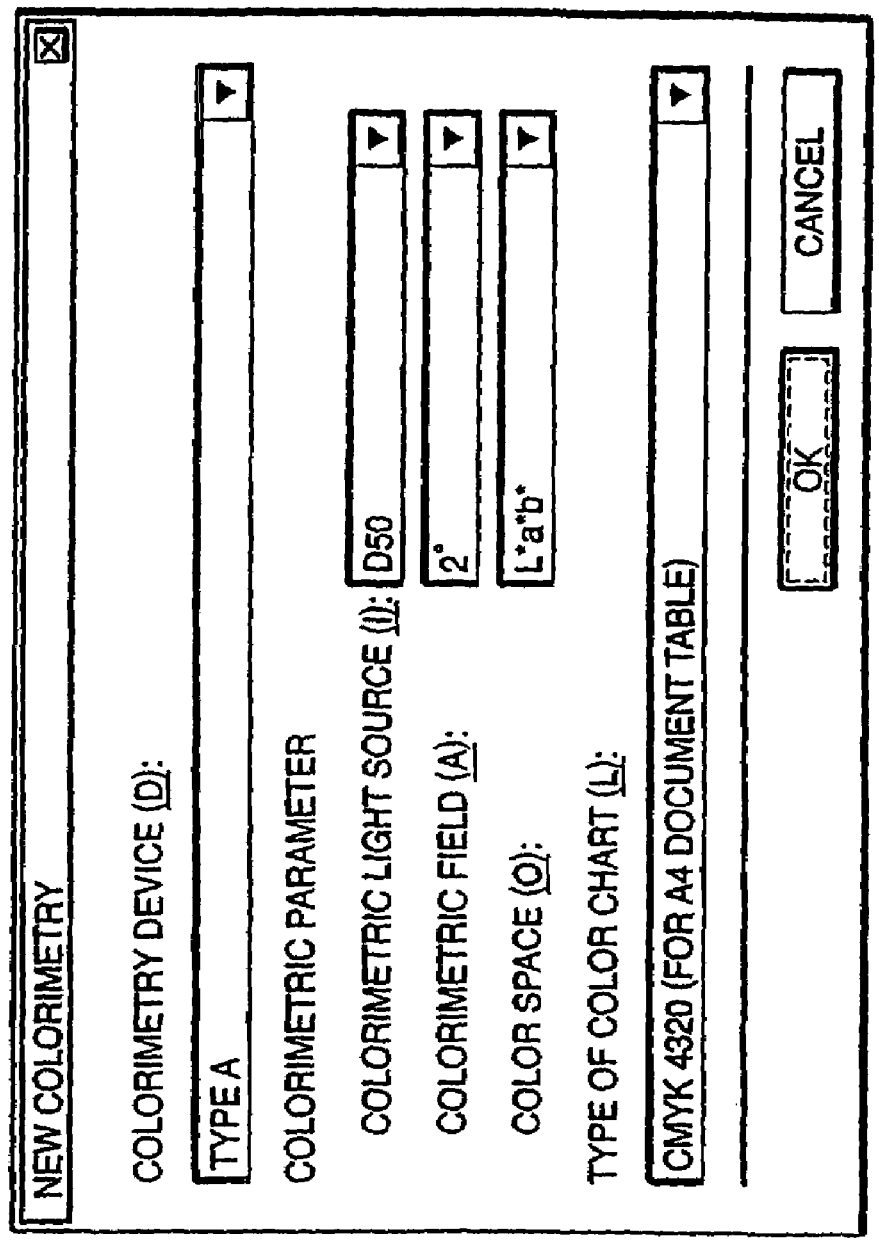
FIGS. 15 to 19 show user interfaces in the colorimetric process.

When the operator instructs start of the colorimetric process, a window shown in, e.g., FIG. 15 is displayed, and the operator selects a colorimetry device, colorimetric parameters (colorimetric light source, colorimetric field, and color space), and the type of sample image (color chart) from popup menus in step S21.

Figure 16:
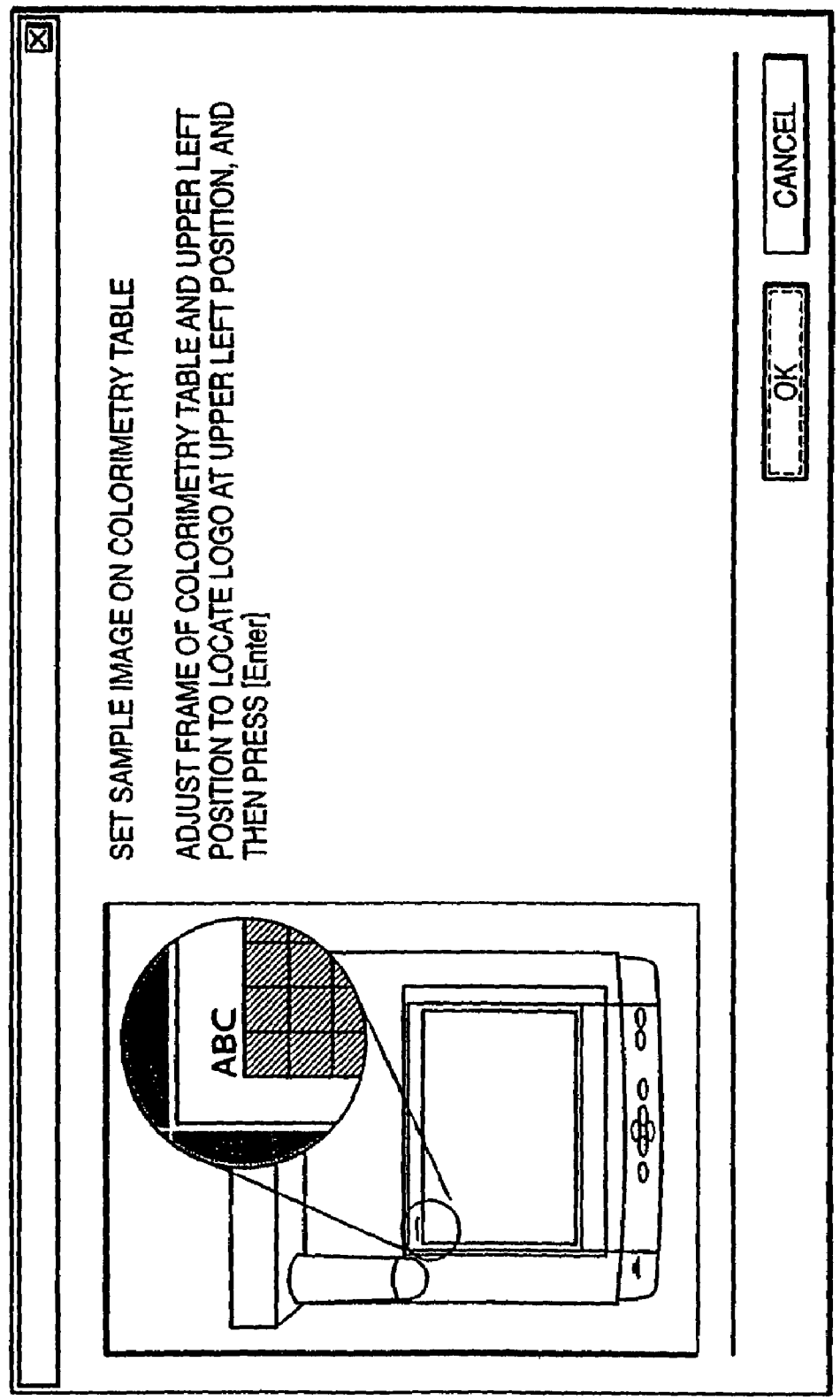

When the operator has pressed an [OK] button on the window shown in FIG. 15, a window shown in, e.g., FIG. 16 is displayed, and the operator sets a sample image output by the output device on a colorimetric table according to an instruction in step S22.

Figure 17:
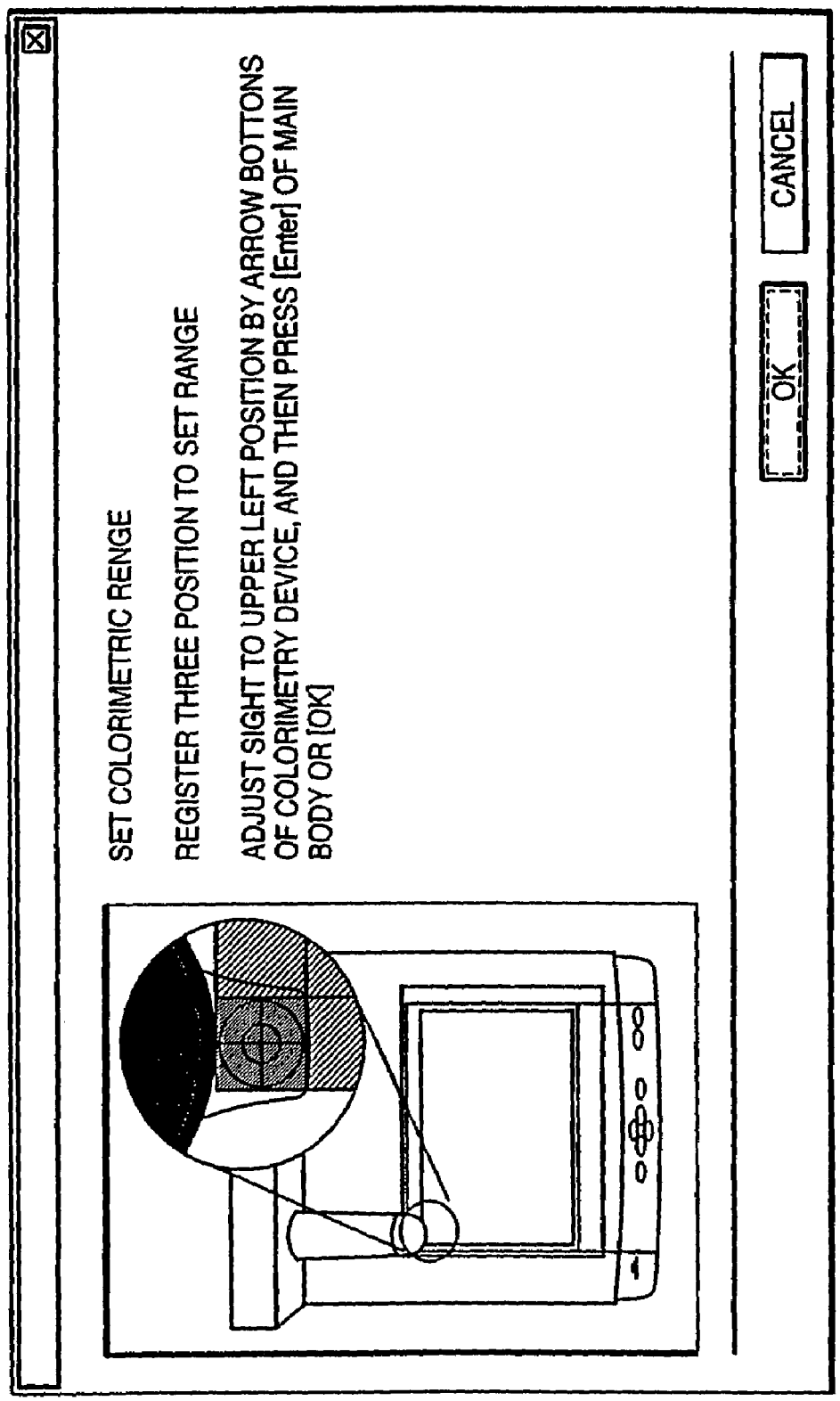
Figure 18:
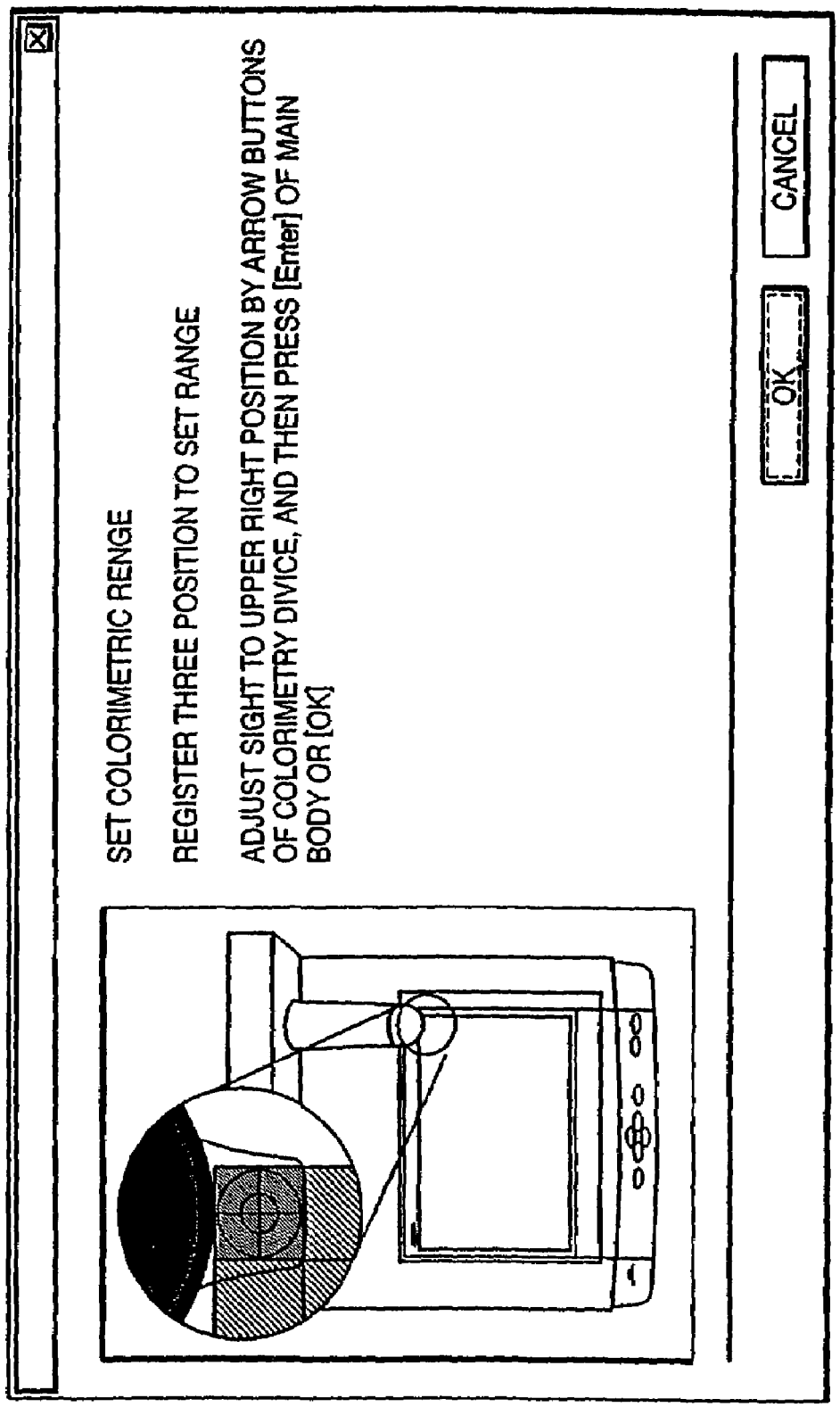
Figure 19:
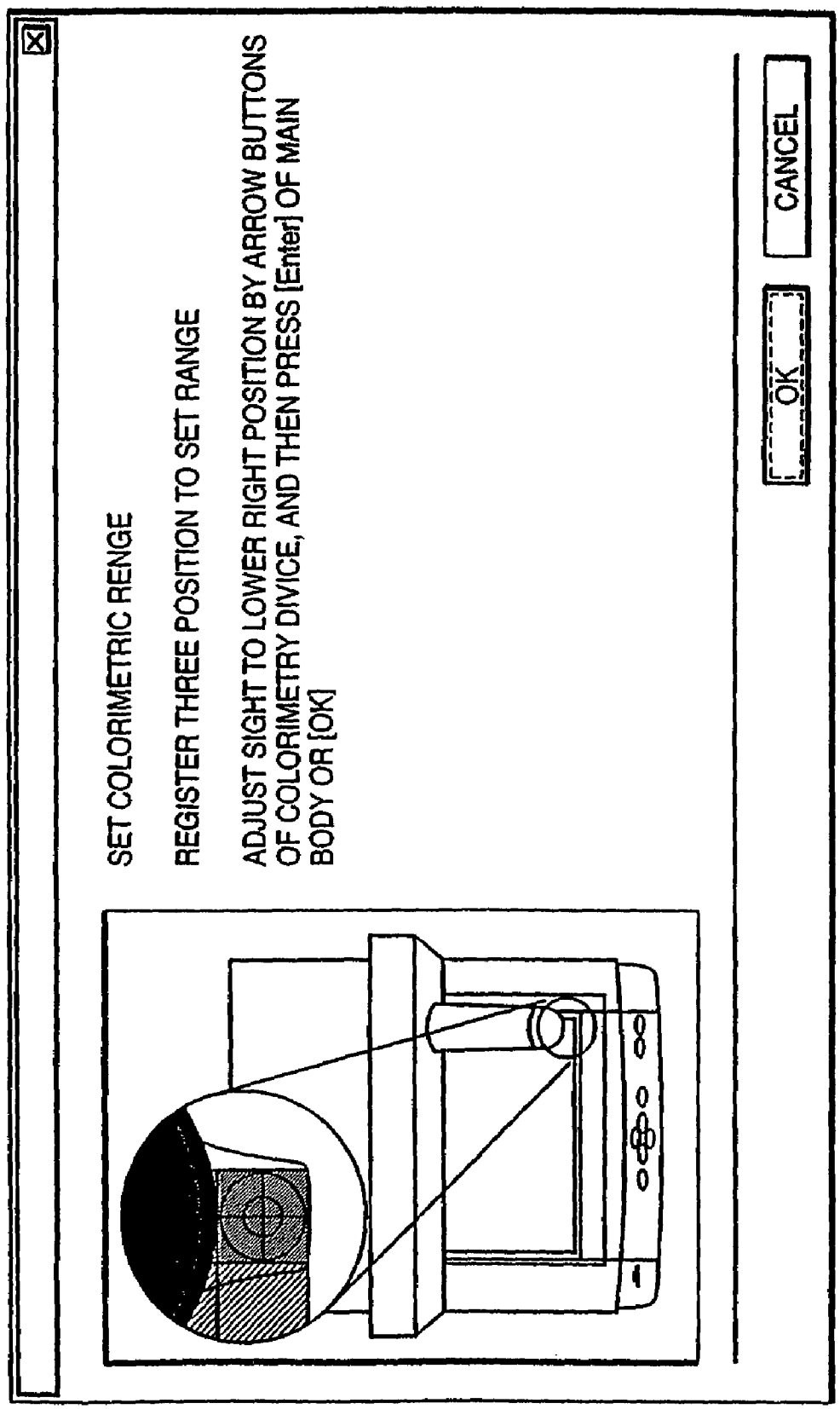

When the operator has pressed an [OK] button on the window shown in FIG. 16, a window shown in, e.g., FIG. 17 is displayed, and the operator sets the upper left position of a colorimetric range of the sample image according to an instruction in step S23. Subsequently, windows shown in, e.g., FIGS. 18 and 19 are displayed in turn, and the operator sets the upper right and lower right positions of the colorimetric range of the sample image according to an instruction.

Upon completion of the above operations, the colorimeter 1001 and colorimetric module 1002 measure color patches of the sample image in step S24. Upon completion of colorimetry, it is checked in step S25 if all sample images have been measured. If sample images to be measured still remain, the flow returns to step S22 to repeat the processes in steps S22 to S24. If the sample image has an A4 size, two IT8 images (928 patches), or 10 4320 CMYK images (4320 patches) must be measured.

Figure 20:
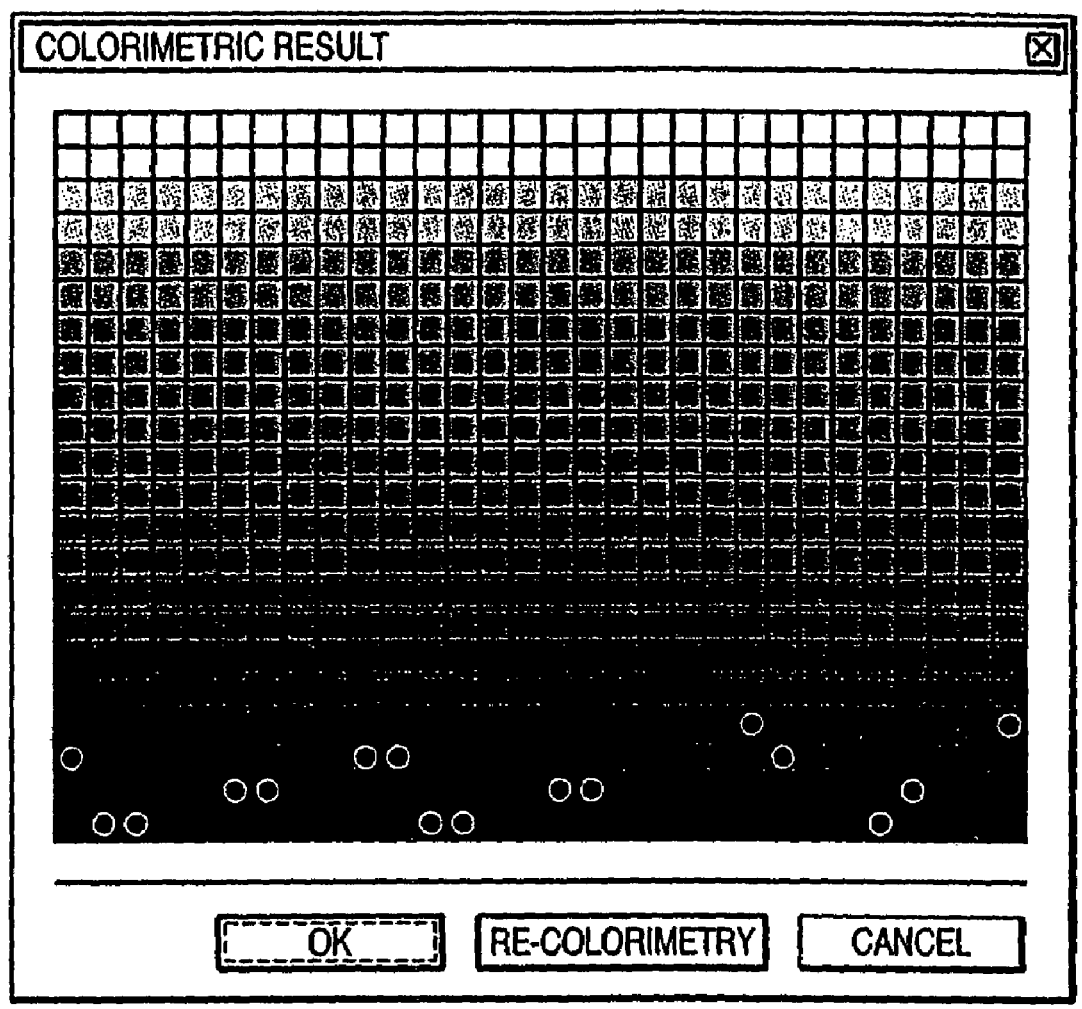
FIG. 20 shows a user interface used to display the colorimetric result.

Upon completion of the colorimetry of the sample images, the colorimetric result is color-displayed in step S26. FIG. 20 shows an example of a window that displays the colorimetric result. Respective small frames of the colorimetric result in FIG. 20 represent color patches, which are displayed in measured colors. ● marks in some small frames indicate an alarm (details will be explained later) for the measurement result.

The operator determines in step S27 with reference to the displayed colorimetric result shown in FIG. 20 if the colorimetric process is to be executed again. If the operator instructs to execute the colorimetric process again, only color patches with the alarm marks (●) are measured again in step S28, and the flow returns to step S26 to display the colorimetric result again.

The profile generation module 1003 generates profiles of the output device on the basis of Lab colorimetric values obtained from the sample images in the same manner as in the above embodiment. According to the fourth embodiment, the operator can easily set complicated parameters using the user interface, and can accurately measure the colors of the sample images.

In the above description, the colorimetric result is displayed after the sample images are read. Alternatively, the colorimetric results may be displayed every time each color patch is read.

[Alarm Process]

The process associated with an alarm generated in step S26 will be described in detail below.

FIG. 21 shows an example of a table which stores standard colorimetric values used by the color patch generator 108. Upon outputting a sample image (color patches 109), CMYK values stored in the table are output to the output device, which outputs a sample image.

FIG. 21 defines standard Lab colorimetric values and allowable differences ΔE corresponding to CMYK values of the color patches. This table is prepared in advance in correspondence with the type of sample image (color chart) that can be selected on the user interface shown in FIG. 14. Since this table is in a text format having blanks or commas as delimiters, Lab colorimetric values and allowable differences ΔE can be arbitrarily set.

The profile generation module 1003 compares a colorimetric value Lab of each color patch and a corresponding standard value $Lab_i$ stored in the table, and when the difference exceeds an allowable difference ΔE, the module 1003 attaches an alarm mark to the colorimetric result, that is, if (|Lab−$Lab_i$|>ΔE)alarm mark$_i$=true;

Hence, when the colorimetric result of a given color patch has deviated from the standard colorimetric value by the allowable difference or larger, an alarm mark is displayed on the colorimetric result of that color patch. If the operator instructs to execute the colorimetric process again, only color patches corresponding to the colorimetric results with alarm marks are measured again to display the colorimetric results again.

In this way, the fourth embodiment has a function of re-measuring color patches displayed together with the alarm marks. With this function, not all color patches need be measured upon executing the colorimetric process again. Also, the user need not designate color patches to be measured again. Hence, minimum required color patches can be easily measured again.

When the alarm marks are displayed in this manner, the state of the output device can be recognized. When a large number of alarm marks are displayed, or when alarm marks are concentratively displayed on color patches of given colors, this means that the color reproduction characteristics of that output device considerably deviate from the standard, and it is determined that it is hard to attain high-precision proof even when the profiles are optimized.

Furthermore, in the fourth embodiment, since the allowable differences ΔE can be set, criteria according to user's purpose can be provided by controlling the allowable differences ΔE according to user's purpose. Since the allowable differences ΔE can be set for respective color patches, alarm marks can be used as criteria according to user's purpose by setting allowable differences ΔE of colors important for the user (e.g., flesh colors) more strictly than other colors.

A plurality of tables shown in FIG. 21 are prepared, and the user selects one of these tables according to his or her purpose or the type of output device when the output device outputs color patches. In this manner, the alarm display can be made in accordance with the user's purpose or the type of output device. The user may select one of the plurality of tables using the popup menu "type of color chart" on the user interface shown in FIG. 15 in step S21 shown in FIG. 14. As the table names displayed in the popup menu, the user may arbitrarily append a title or comment to each table, and that title or comment may be displayed.

When alarm marks are displayed for most of color patches, colorimetric conditions may be inadequate. Hence, the colorimetric conditions must be re-set, and the colorimetric process must be redone.

[Generation of Profile]

Generation of the profiles of the output device will be described in detail below.

Figure 22:
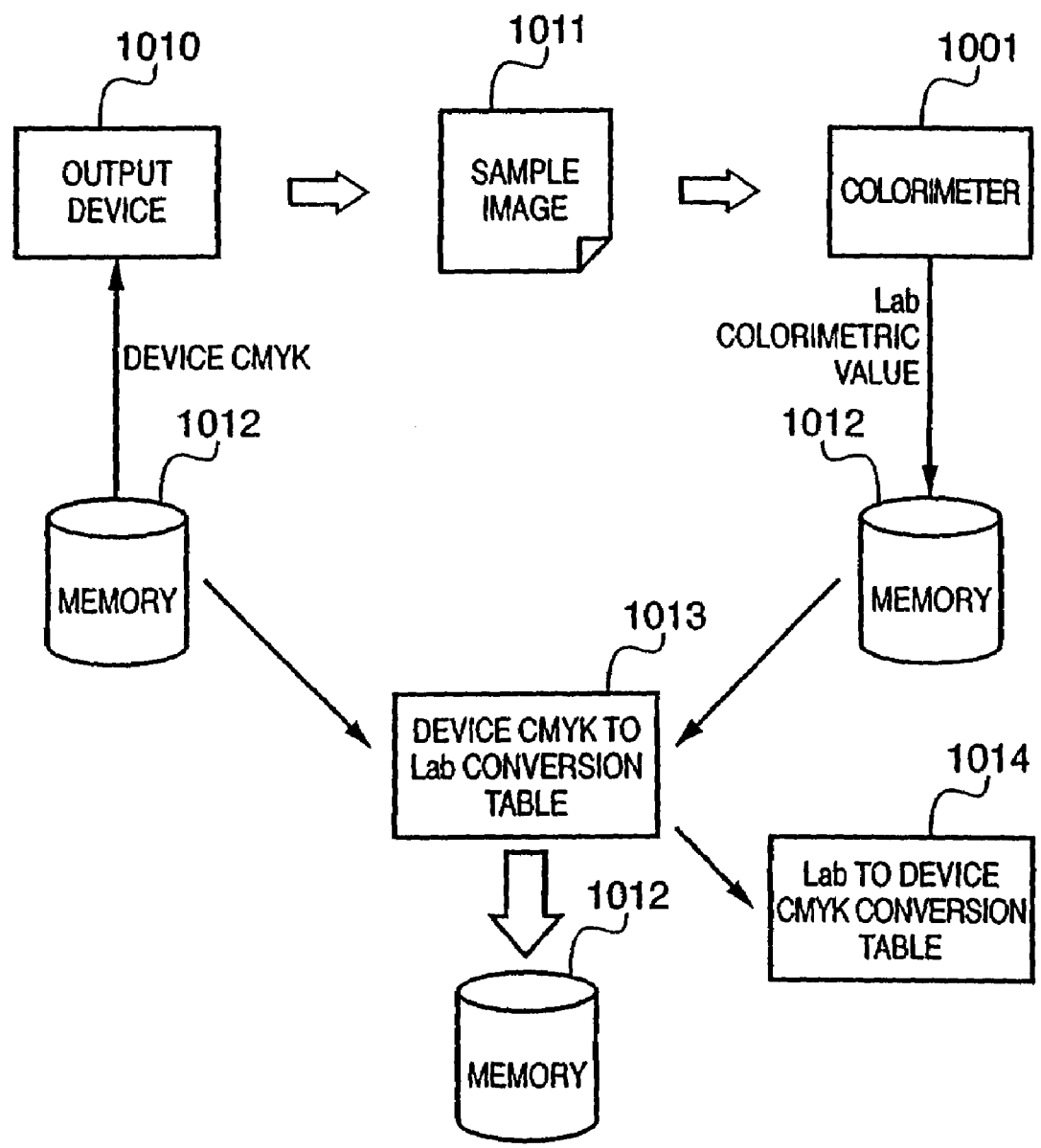
FIG. 22 is a diagram for explaining a profile generation sequence of a target.

FIG. 22 is a diagram for explaining the generation sequence of the profile of a target, i.e., the process explained in the second embodiment more briefly.

Device CMYK data of a sample image selected by the user from a memory 1012 is supplied to an output device 1010, thus printing a sample image 1011. As the sample image, a standard IT8 or 4320 CMYK image or the like is used.

The colorimeter 1001 and colorimetric module 1002 measure color patches of the sample image 1011 printed by the output device 1010, and Lab colorimetric values are stored in the memory 1012. The profile generation module 1003 generates a device CMYK to Lab conversion table 1013 corresponding to an AtoB0 tag of an ICC profile, and stores it in the memory 1012.

Since a BtoA0 tag is required in addition to the AtoB0 tag in consideration of a preview function to be described later, the profile generation module 1003 generates an Lab to device CMYK conversion table 1014 on the basis of the device CMYK to Lab conversion table 1013. Note that these conversion tables are finally stored in the memory 1012 as the ICC profiles of the output device 1010.

Device CMYK values in the device CMYK to Lab conversion table 1013 are equally spaced apart, but Lab colorimetric values are not. When the Lab to device CMYK conversion table 1014 that inputs Lab values is generated, Lab values must be equally spaced apart. Hence, the Lab to device CMYK conversion table 1014 in which Lab values are equally spaced apart is generated based on the device CMYK to Lab conversion table 1013 using the method explained in the first embodiment, and is stored in the memory 1012.

[Smoothing of Colorimetric Value]

Since the colorimeter 1001 is calibrated before it is used, given colorimetric precision is assured. However, some colorimetric errors are inevitably present. Also, the sample image 1011 may include color patches which are not formed satisfactorily depending on the state of the output device 1010. For this reason, Lab colorimetric values are smoothed as needed to suppress the influences of any colorimetric errors and color patches which are not formed satisfactorily.

Figure 23:
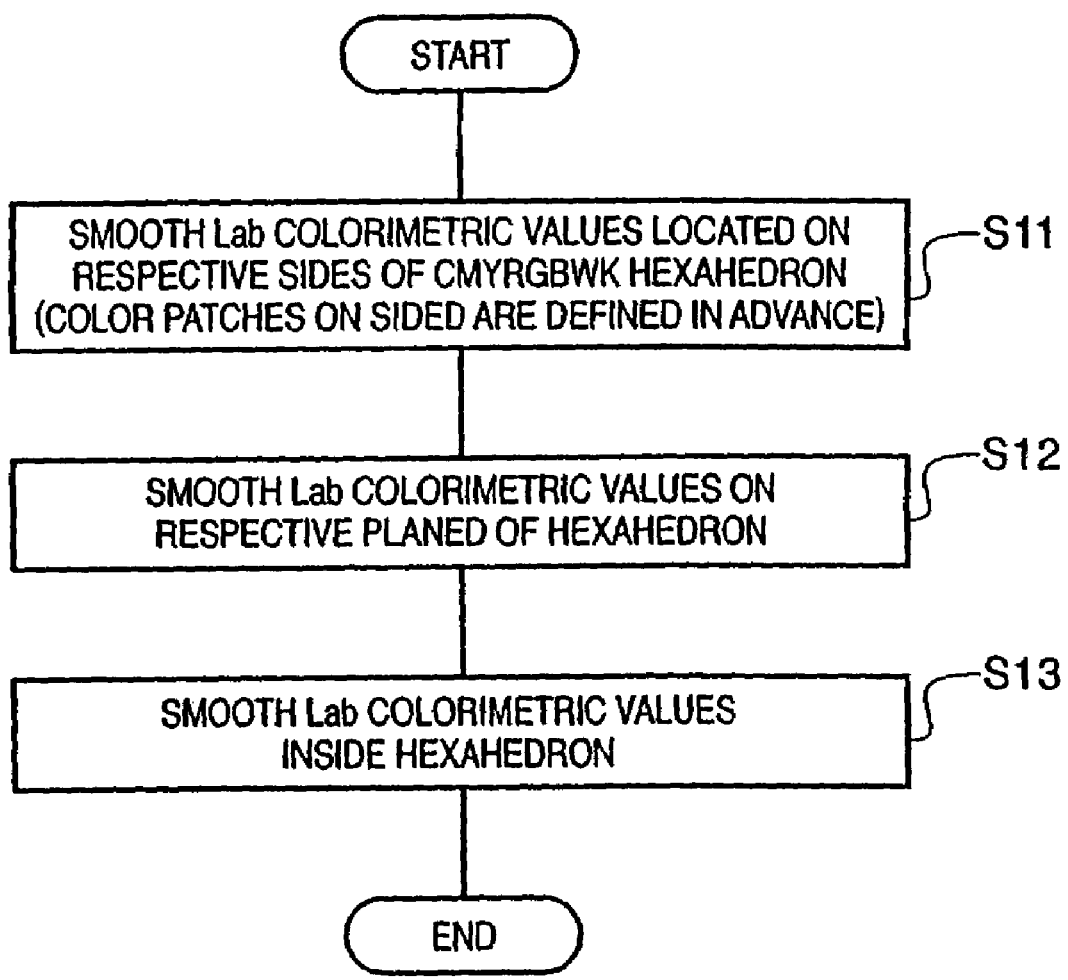
FIG. 23 is a flow chart showing the smoothing sequence of colorimetric values.

FIG. 23 is a flow chart showing the smoothing sequence of colorimetric values.

In step S11, Lab colorimetric values located on respective sides of a CMYRGBWK hexahedron on the Lab color space, which is defined by Lab colorimetric values of the sample image 1011 output from the output device 1010 shown in FIG. 22, are smoothed. As a smoothing method, a colorimetric value of interest and a predetermined number of neighboring Lab colorimetric values on the same side are sampled, and their mean or weighted mean value is used as the Lab colorimetric value of the colorimetric value of interest.

In step S12, Lab colorimetric values on the respective planes of the hexahedron are smoothed using the Lab colorimetric values smoothed in step S11 and Lab colorimetric values located on respective planes. In step S13, Lab colorimetric values inside the hexahedron are smoothed using the Lab colorimetric values on the respective sides and planes of the hexahedron, which are smoothed in steps S11 and S12.

Using the smoothed Lab colorimetric values, the device CMYK to Lab conversion table and Lab to device CMYK conversion tables are generated by the aforementioned method.

Device RGB values (108 in FIG. 1) also form a solid on the RGB color space. The sides and planes of the hexahedron on the Lab color space respectively correspond to those of the solid on the RGB color space. Hence, the locations of the Lab colorimetric values on the sides and planes can be easily selected from the device RGB values of the color patches used to output the sample image 1011.

Note that Lab colorimetric values may be plotted on the Lab color space, and the plot result may be analyzed to select Lab colorimetric values located on the sides and planes.

Smoothing of colorimetric values has the following merits and demerits. As the merits, the influences of colorimetric errors and color patches which cannot be formed satisfactorily can be suppressed. On the other hand, as the demerits, when colorimetry and formation of color patches are satisfactorily done, the measurement precision may impair.

[Smoothing of Conversion Tables]

A printer and printing press has strong nonlinear output characteristics. Therefore, when a profile generated based on the colorimetric result is used, pseudo edges and the like are readily generated in an output image. Hence, conversion tables are smoothed to maintain tone continuity, as needed.

Upon smoothing the device CMYK to Lab conversion table 1013, an Lab value corresponding to a grid point of interest (CMYK input value) and a predetermined number of Lab values at neighboring grid points are sampled, and their weighted mean value is set as an Lab value (output value) corresponding to the grid point of interest.

Likewise, upon smoothing the Lab to device CMYK conversion table 1014, a CMYK value corresponding to a grid point of interest (Lab input value) and a predetermined number of CMYK values of neighboring grid points are sampled, and their weighted mean value is set as an Lab value (output value) corresponding to the grid point of interest.

As the weighting method, a weight of the output value corresponding to the grid point of interest (input value) is set to be smaller than the total weight of the output values of neighboring grid points. For example, the number of sampling points is 7, the weight corresponding to the grid point of interest is 0.4, and the weight corresponding to each of six neighboring grid point is 0.6/6. Note that the weighting method is changed based on the number of grid points of the conversion table to be generated, which is set by a popup menu "optimization" on a user interface shown in FIG. 25. For example, when the number of grid points is small, and the grid spacing is large, a weight corresponding to each neighboring grid point is reduced.

Smoothing of the conversion tables has the following merits and demerits. As the merits, tone continuity can be improved, and pseudo edges of an output image can be suppressed. On the other hand, as the demerits, the degree of faithfulness with respect to the color reproduction characteristics of a printer lowers.

[Interface]

The color conversion module shown in FIG. 11 is supplied to, e.g., a personal computer or the like as software, and is implemented. Whether or not to execute smoothing can be set via a user interface displayed on the monitor 1004.

Figure 24:
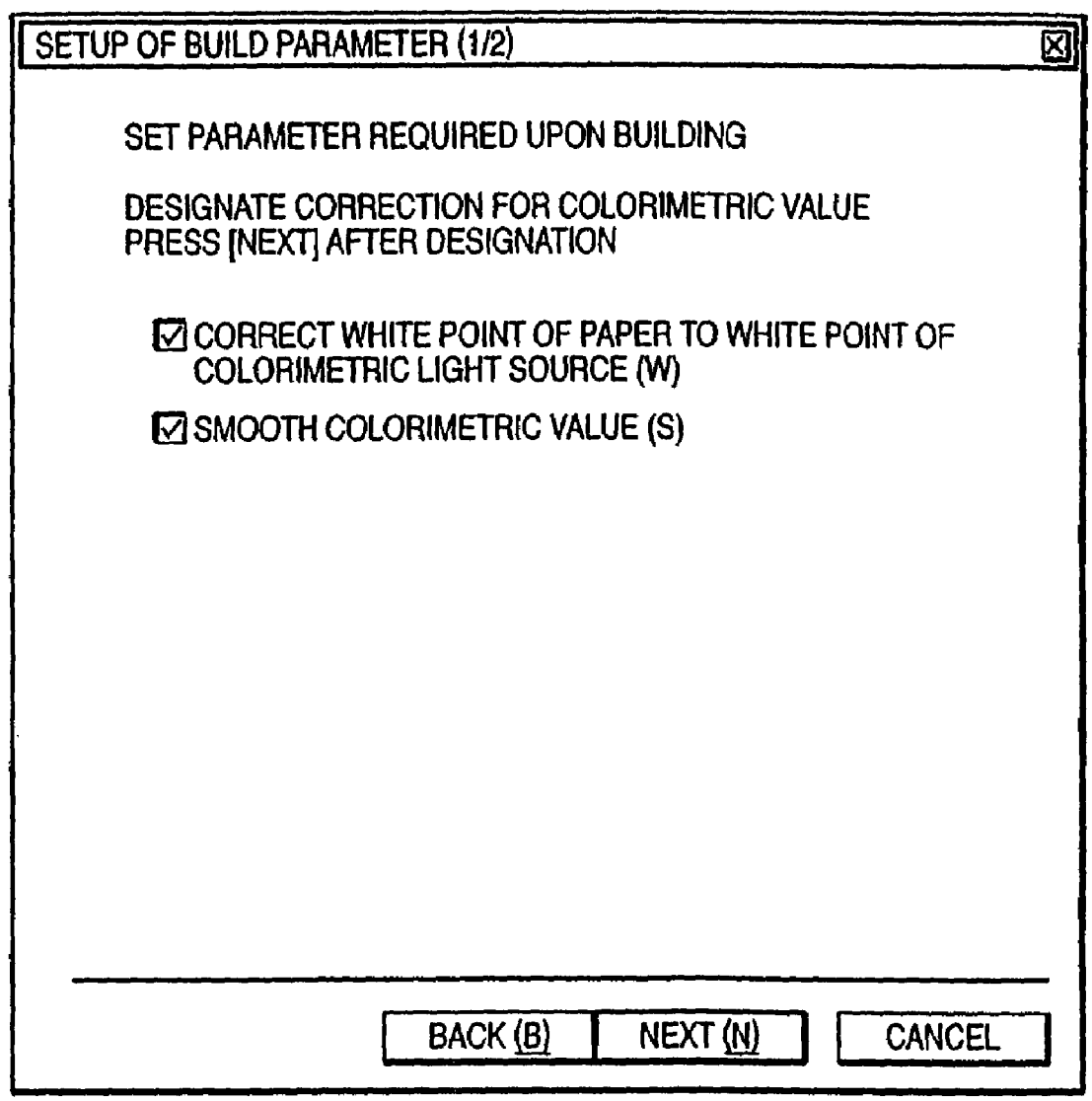
FIGS. 24 and 25 show parameter setup windows displayed upon generating a profile of a target.
Figure 25:
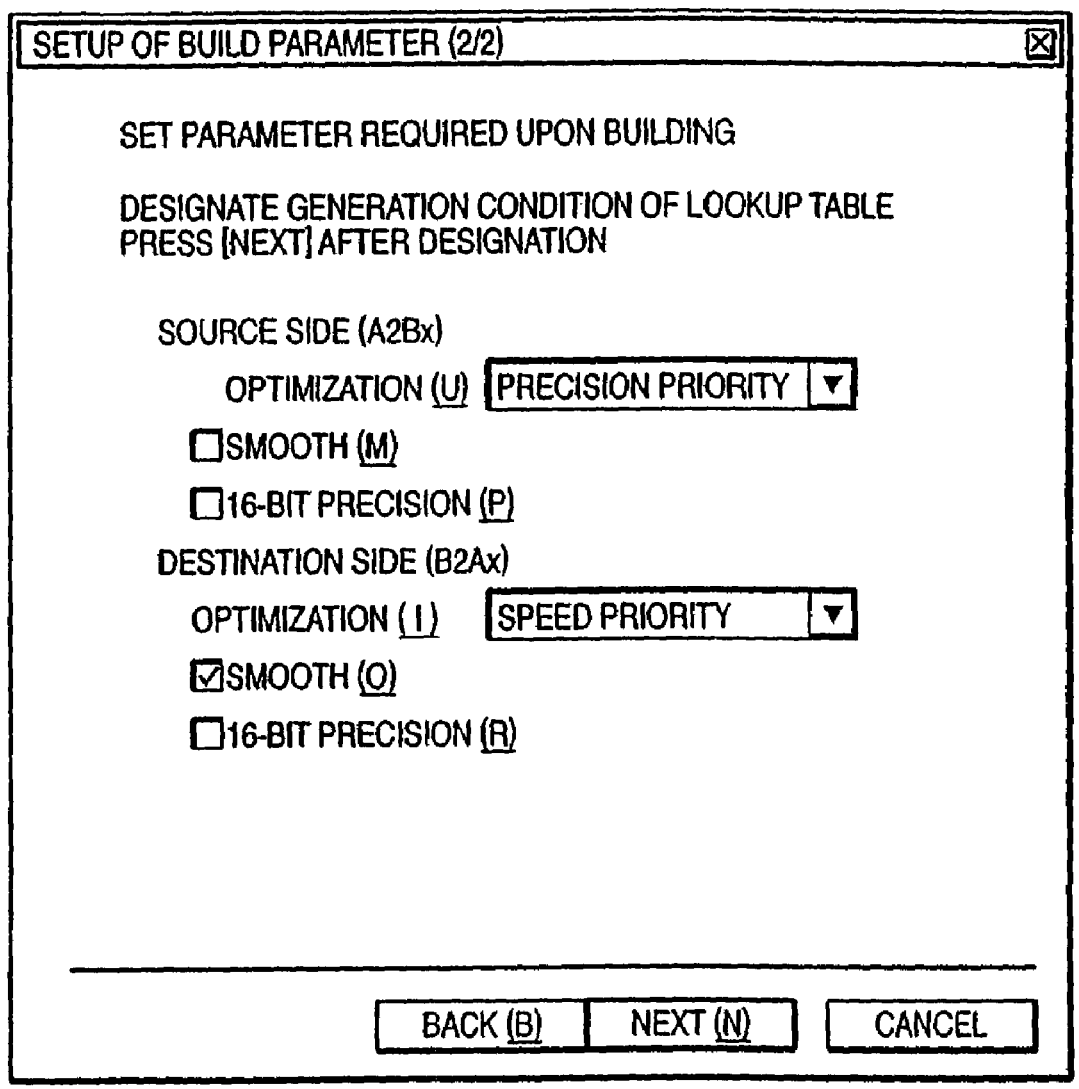

FIGS. 24 and 25 show parameter setup windows displayed upon generating the profile of the output device 1010.

When a check box "smooth colorimetric values" on the window in FIG. 24 is checked, the aforementioned smoothing process of colorimetric values is executed.

When a check box "smooth" on the source side of the window in FIG. 25 is checked, the device CMYK to Lab conversion table 1013 is smoothed; when a check box "smooth" on the destination side is checked, the Lab to device CMYK conversion table 1014 is smoothed.

In this way, in the fourth embodiment, whether or not to smooth the device CMYK to Lab conversion table 1013 and Lab to device CMYK conversion table 1014 can be independently set. By contrast, whether or not to smooth colorimetric values cannot be independently set. This is attributed to different smoothing purposes. That is, the smoothing of colorimetric values is a process corresponding to colorimetric precision, and smoothing of conversion tables is a process corresponding to the conversion processing results of the conversion tables.

The numbers of grids of the device CMYK to Lab conversion table 1013 and Lab to device CMYK conversion table 1014 can be set by popup menus "optimization" on the source and destination sides shown in FIG. 25. That is, "precision priority" or "speed priority" can be selected as optimization by the popup menu.

When "precision priority" is selected, the device CMYK to Lab conversion table 1013 is defined by 17×17×17×17 grids, and the Lab to device CMYK conversion table 1014 is defined by 33×33×33 grids. On the other hand, when "speed priority" is selected, the device CMYK to Lab conversion table 1013 is defined by 9×9×9×9 grids, and the Lab to device CMYK conversion table 1014 is defined by 17×17×17 grids.

In this way, the numbers of grid points of the conversion tables can be independently set, which is one of the reasons why smoothing of the conversion tables can be independently set.

The aforementioned alarm process of colorimetric values can be used as criteria upon determining whether or not to smooth colorimetric values. For example, when alarm marks are displayed on many color patches, colorimetric values are often preferably smoothed.

[History Management]

The profile of the target generated based on the colorimetric result in the aforementioned sequence is saved in the memory 1012. In this case, a profile generation history or the like may be saved to manage the generation process of the profile.

Figure 26:
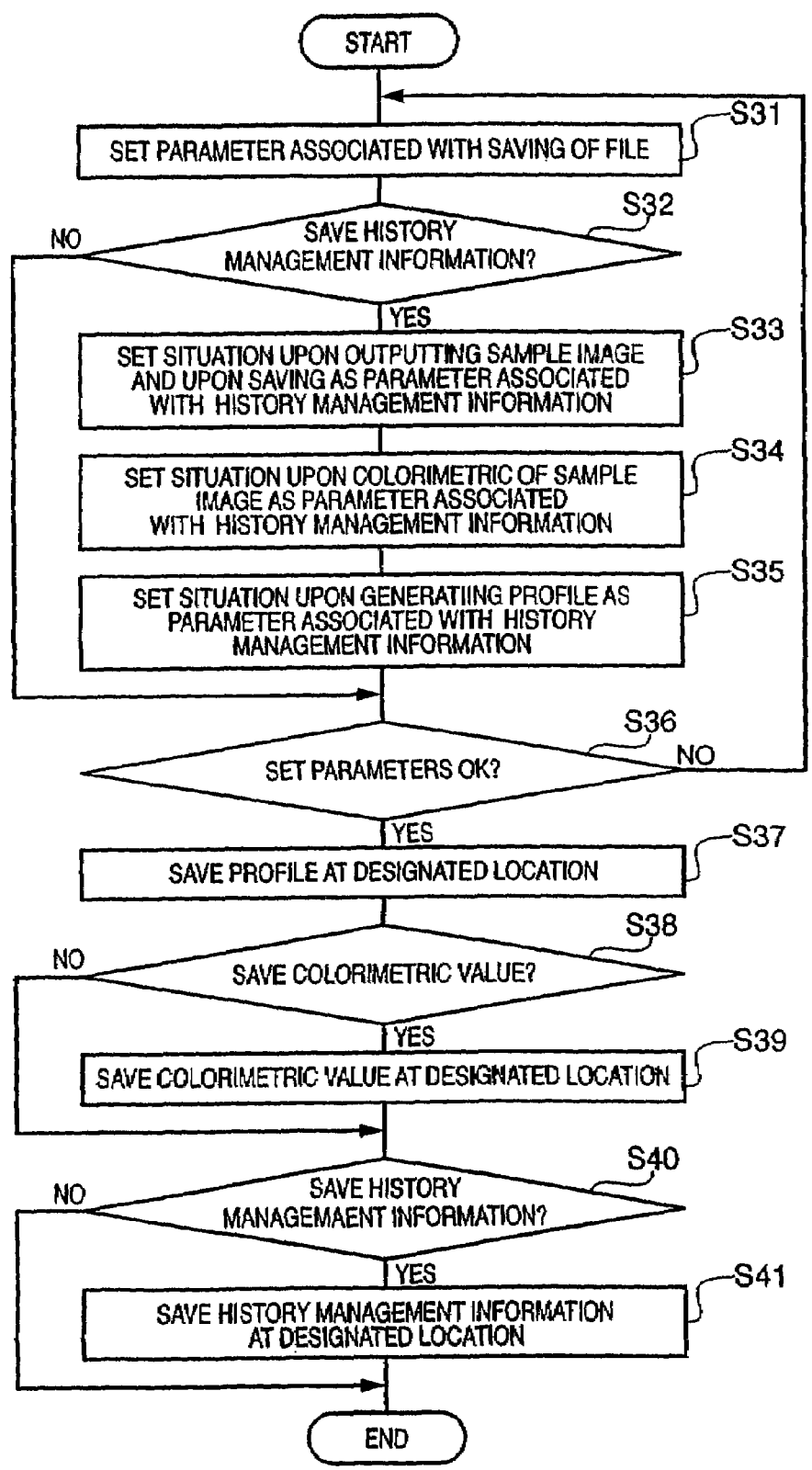
FIG. 26 is a flow chart showing the sequence for saving a profile, colorimetric values, and history management information.

FIG. 26 is a flow chart showing the sequence for saving colorimetric values and history management information, which is executed by the profile generation module 1003.

Upon completion of profile generation by the profile generation module 1003, a window shown in FIG. 27 is displayed on the monitor 1004 in step S31, and the operator sets whether or not to save parameters (saving location and profile name) associated with saving of a file, and colorimetric values, whether or not to save history management information, and the like. Note that "icc" is given as a default extension of the profile name. The file names of colorimetric values and history management information are obtained by changing only the extension of the profile name to "it8, "pbh", and the like.

It is checked in step S32 if history management information is to be saved. If NO in step S32, the flow jumps to step S36.

If the history management information is to be saved, a window shown in FIG. 28 is displayed in step S33, and the operator sets the situation (output date, operator, printer name and location, and paper and ink used) upon outputting a sample image, the situation (saving location) upon saving the sample image, and the like.

In step S34, a window shown in FIG. 29 is displayed, and the operator sets the situation (colorimetry date, operator, colorimetry device, colorimetric light source, and colorimetric field) and the like upon colorimetry.

In step S35, a window shown in FIG. 30 is displayed, and the operator sets the situation (operator and remarks) and the like upon generating the profile. Note that parameters such as "ON/OFF of white point correction of colorimetric values" and "ON/OFF of smoothing of colorimetric values", and "optimization (precision priority or speed priority)", "ON/OFF of smoothing", "table precision (8 or 16 bits)", bit precision, and the like associated with lookup tables are set upon generating the profile, and these parameters are automatically saved in the history management information.

In step S36, a set parameter list is displayed on the monitor 1004. When the operator wants to correct or modify the parameters, the flow returns to step S31. If the parameters need not be corrected or modified, the flow advances to step S37 to save a profile with a file name, e.g., ddcp.icc in the designated saving location (e.g., the designated directory or folder of the memory 1012).

It is then checked in step S38 if colorimetric values are saved. If YES in step S38, a list of colorimetric values (see FIG. 31), which has a file name, e.g., ddcp.it8 and a text file format, is saved at the same saving location as the profile in step S39.

It is checked in step S40 if history management information is saved. If YES in step S40, history management information (see FIG. 32) which has a file name, e.g., ddcp.pbh and a text file format is saved at the same saving location as the profile in step S41.

In this manner, not only the generated profile of the target, but also colorimetric results used in generation of the profile, and history information upon colorimetry and generation of the profile can be saved and managed. Therefore, when any abnormality is found in the generated profile, its cause may be examined with reference to history information, or a profile is re-generated based on the saved colorimetric results, thus allowing easy troubleshooting.

[Preview]

The preview function of making monitor display for confirming if the generated profile of the target is appropriate will be explained below. The preview function is launched after the profile is generated by the aforementioned process.

Figure 12:
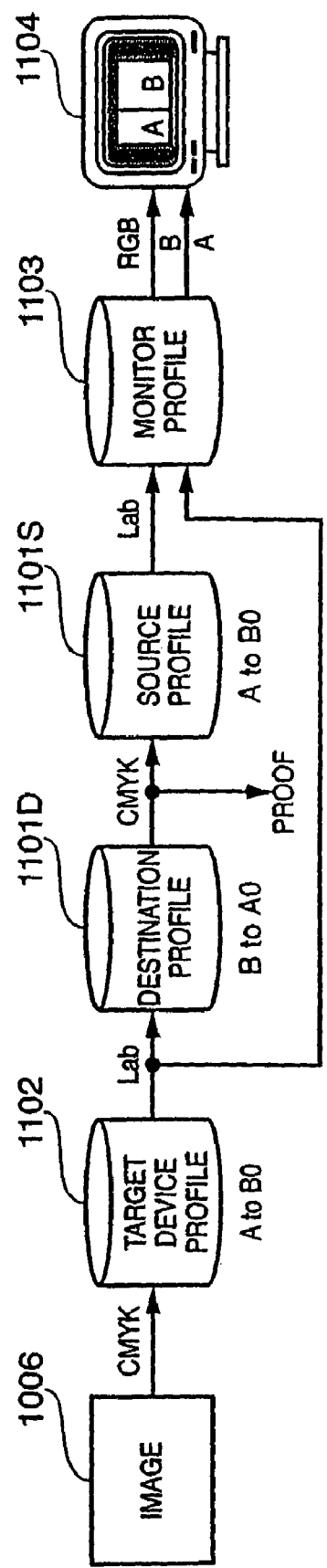
FIG. 12 is a diagram showing the color conversion sequence executed by a CMM shown in FIG. 11.

FIG. 12 is a diagram showing the color conversion sequence executed by the CMM 1007 shown in FIG. 11.

CMYK data of an image 1006 is converted into Lab data by the AtoB0 tag of the target device profile 1102, and is then converted into CMYK data of the CMYK color space which depends on the output device 1010 by the BtoA0 tag (destination profile 1101D) of output device profiles 1101. Upon executing proof, this CMYK data is sent to an output device for proof.

The CMYK data of the CMYK color space which depends on the target is converted again into Lab data by the AtoB0 tag (source profile 1101S) of the output device profiles 1101. The Lab data is converted into RGB data of the color space which depends on the monitor 1004 by the monitor profile 1103, and the RGB data is displayed on the monitor 1004. That is, an image which is to be printed by the target, i.e., preview image B, can be displayed on the monitor 1004, and its color reproducibility can be observed.

Furthermore, when the Lab data converted using the target device profile 1102 is directly converted into RGB data using the monitor profile 1103, and the RGB data is displayed as original image A on the monitor 1004, preview image B that has undergone color conversion using the output device profiles 1101 and original image A (image to be output by the target device) that has not undergone any color conversion can be observed and compared on the monitor 1004. Therefore, whether or not the generated output device profiles 1101 are appropriate can be confirmed by observing and comparing the two images.

Figure 13:
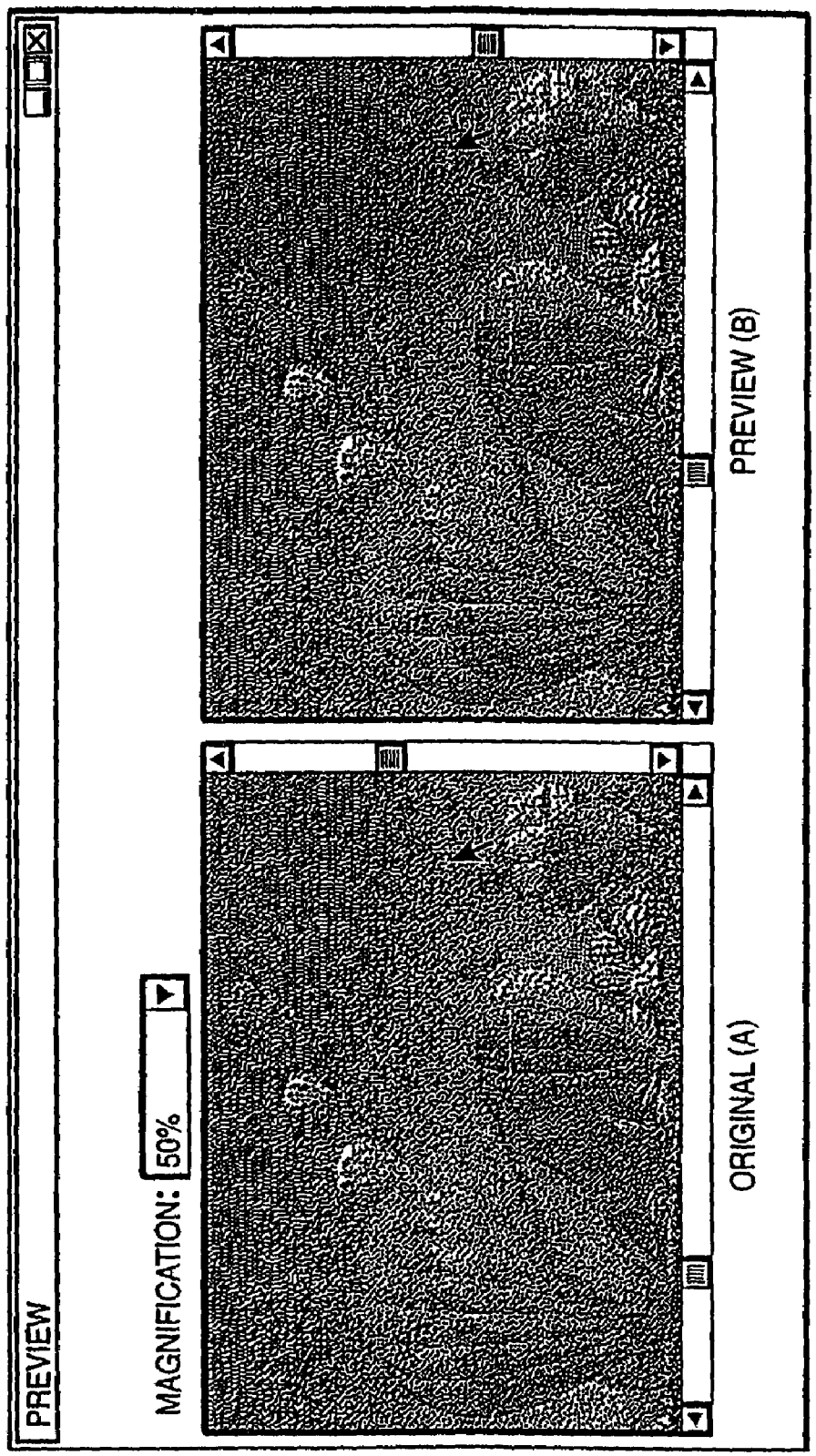
FIG. 13 shows a preview window displayed on a monitor shown in FIG. 12.

FIG. 13 shows an example of a preview window displayed on the monitor 1004. For example, original image A is displayed on, e.g., the left window, and preview image B is displayed on the right window. Note that the two images have the same window sizes in FIG. 13. When the operator moves the centers of the two windows by, e.g., a mouse or the like, these windows have arbitrary window sizes.

When a magnification on the upper left position of the preview window is changed, the magnifications of the two images change. On the other hand, when the operator scrolls one image, the other image scrolls together. That is, the upper left position of the window is always located on the same position on the image. Furthermore, while the operator sets a mouse cursor on one image and presses the mouse button, another mouse cursor is displayed at the corresponding position on the other image. With such user interface of the preview window, the operator can easily observe and compare details of the two images.

According to the fourth embodiment, the generation results of the output device profiles 1101 can be easily confirmed. Since a preview image (display image A) of the target device suitable for proof and an image (display image B) that has been processed using the generated output device profiles 1101 are displayed side by side, the operator can confirm the generation results of the output device profiles 1101 very easily.

Fifth Embodiment

An image process according to the fifth embodiment of the present invention, and a method of estimating the device profile regeneration timing will be explained below. Note that the same reference numerals in this embodiment denote the same parts as in the first to fourth embodiments, and a detailed description thereof will be omitted.

[Estimation of Profile Regeneration Timing]

Figure 33:
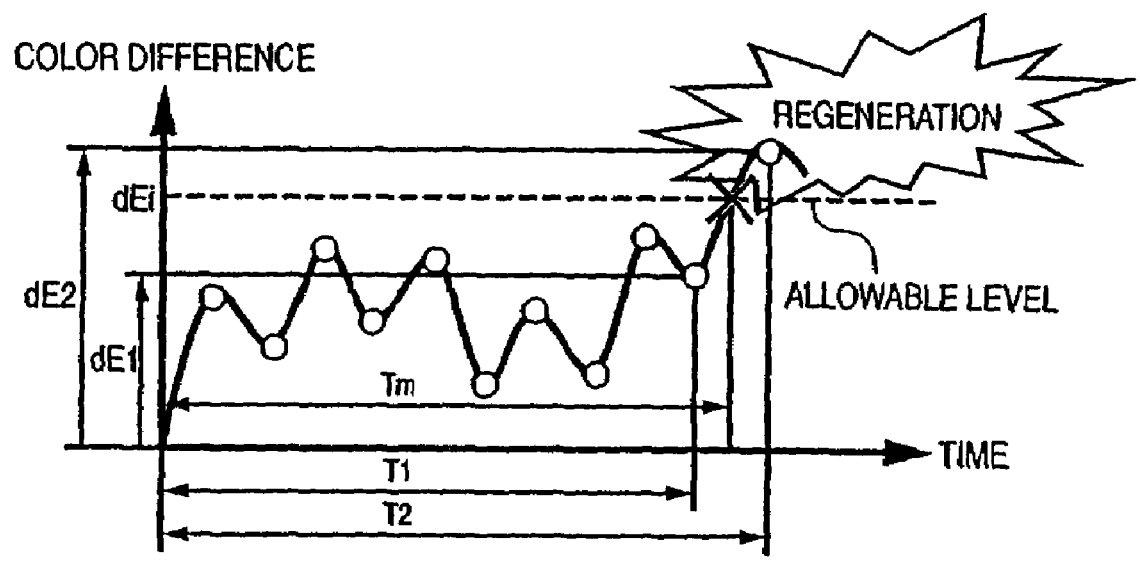
FIG. 33 shows the concept of a profile regeneration timing.

FIG. 33 shows the concept of the profile regeneration timing.

Colorimetric values Lab of color patches output at different timings and their history information are read, and the colorimetric values and standard colorimetric values $Lab_i$ described in the fourth embodiment are compared. If no standard colorimetric values $Lab_i$ are available, colorimetric values used upon generating a profile are used in place of them.

On the basis of the relationship between the "color chart output dates" in the history information and color chart average color differences from the standard colorimetric values $Lab_i$, color difference variations are obtained time-serially. Note that time-serial color difference variations need not be arranged at given intervals. In other words, the intervals of "color chart output dates" may be unequal. A timing at which a curve approximated by coupling color difference values at respective "color chart output dates" crosses a color difference allowable level dEi is obtained, and is set to be a profile regeneration timing.

Using linear approximation for the sake of simplicity, a term Tm from when a given profile is generated until another profile is generated is calculated by:

$$Tm = T1 + (T2-T1)(dEi-dE1)/(dE2-dE1)$$

where dEi: the color difference of the allowable level dE2: the color difference that has exceeded the allowable level T2: the term from the profile generation date to the "color chart output date" when the allowable level has been exceeded dE1: the color difference immediately before the allowable level is exceeded T1: the term from the profile generation date to the "color chart output date" immediately before the allowable level is exceeded Therefore, when the color difference has exceeded the allowable level dEi, a profile is regenerated, and Tm can be set as a profile regeneration term. Tm is calculated every time the profile is regenerated. In such case, Tm is preferably optimized in consideration of previously calculated Tm. A next regeneration timing can be obtained based on the regeneration term Tm calculated in the past. For example, the next regeneration timing as an optimum timing is obtained from an average value of the plural regeneration terms.

Figure 34:
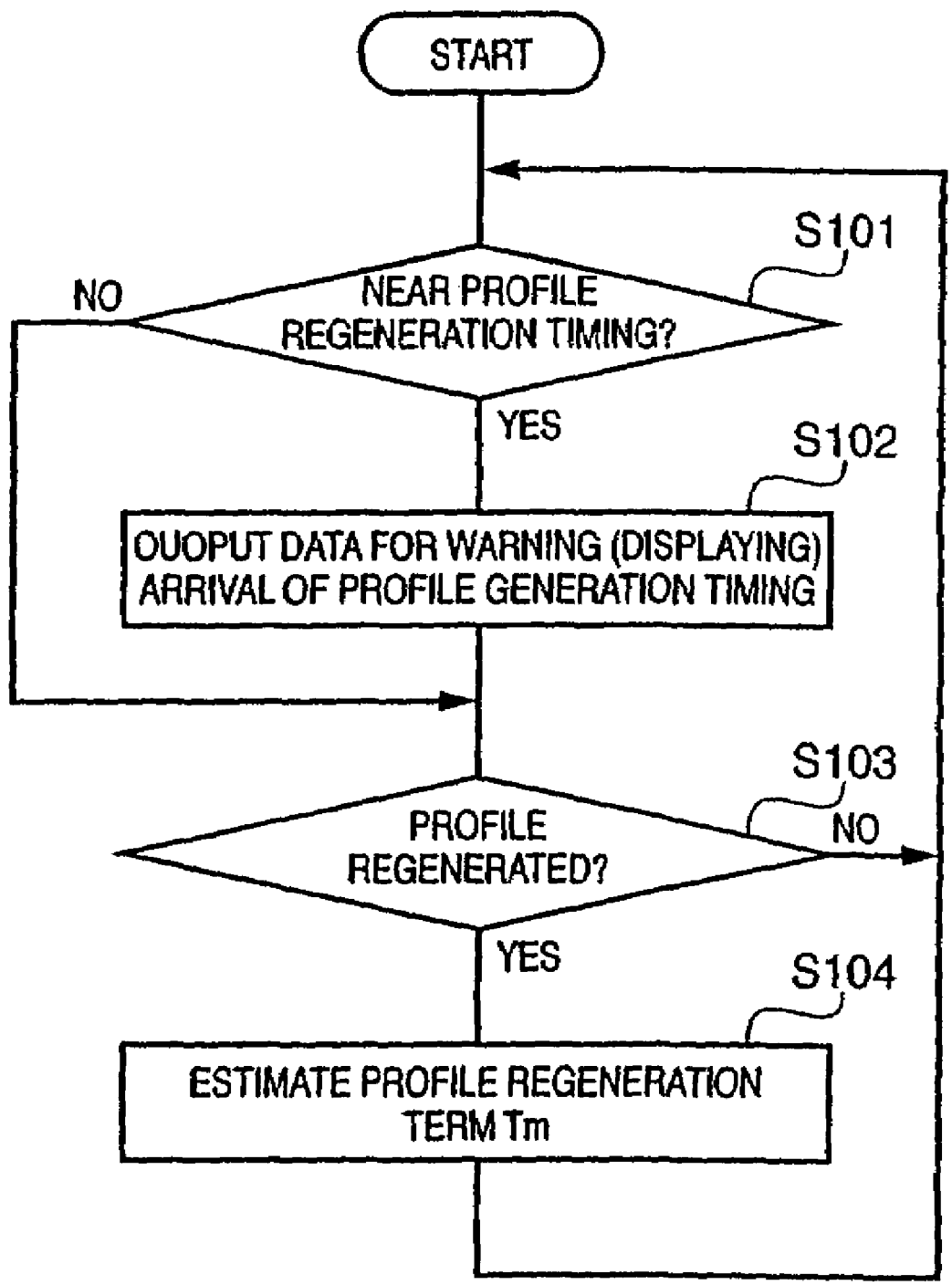
FIG. 34 is a flow chart showing a process for estimating a profile regeneration timing, and generating an alarm.

FIG. 34 is a flow chart showing the process for estimating the profile regeneration timing and generating an alarm, which is executed by, e.g., the profile generation module 1003.

Figure 35:
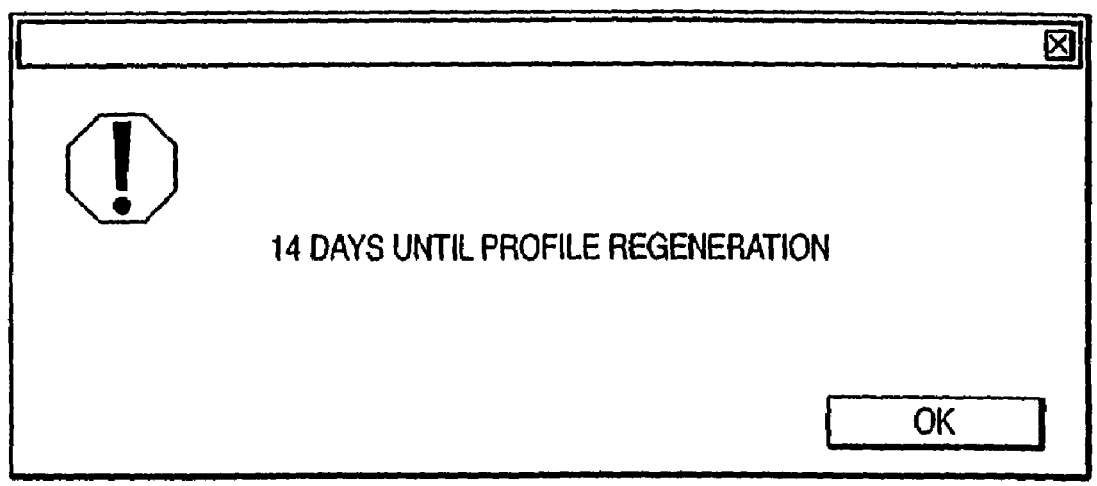
FIG. 35 shows an alarm display example of profile regeneration.

Whether or not the profile regeneration timing comes near is determined by checking if the difference between the term elapsed after previous profile generation date and Tm becomes a predetermined value (e.g., 14 days) (S101). If YES in step S101, data for displaying an alarm shown in, e.g., FIG. 35 is generated, and is output to a monitor or the like (S102). Note that the alarm display timing (14 days before in the example in FIG. 34) can be freely set by the user.

It is checked if the profile is regenerated (S103). If YES in step S103, history management information (colorimetry history) is read out from the memory 1012 or the like in accordance with parameters (saving location and profile name; see FIG. 27) associated with saving of a file, which are designated by the user, and the profile regeneration term Tm is estimated (S104). After that, the flow returns to step S101.

[Color Difference Variation Display]

Figure 36:
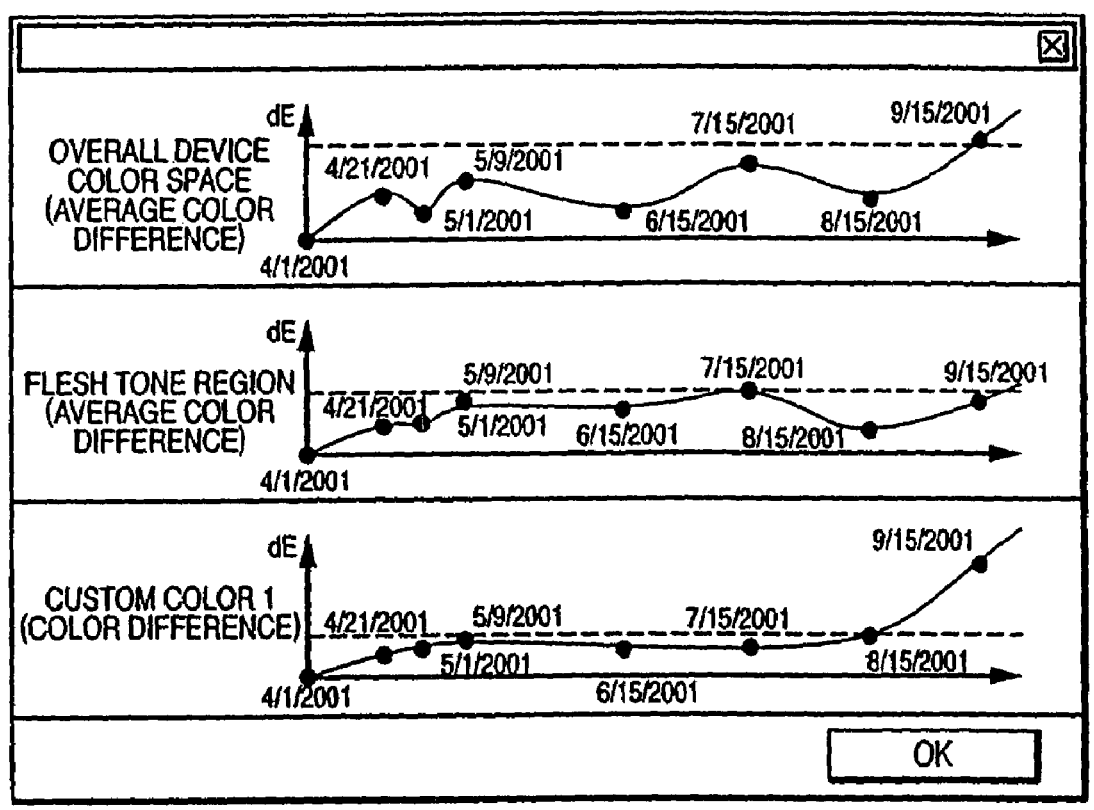
FIG. 36 shows a display example of color difference variations.

When data that visually shows color difference variations shown in, e.g., FIG. 36 is generated and output to the monitor the like in addition to the alarm display shown in FIG. 35, the user may determine the profile regeneration timing. In the example of the color difference variation display shown in FIG. 35, the average color difference for all the color patches (entire device color space), the average color difference for a partial color space region such as a flesh tone region, and the color difference for a custom color such as a spot color are shown.

Also, different color difference allowable levels dEi can be set for respective color difference variations. In this manner, even when the average color difference for all the color patches does not exceed the allowable level, an alarm may be generated when the color difference for, e.g., the flesh tone region has exceeded the allowable level.

Sixth Embodiment

Management of a project database (to be referred to as a "project DB" hereinafter and colorimetric value database (to be referred to as a "colorimetric value DB" hereinafter) according to the sixth embodiment of the present invention will be described below. Note that the same reference numerals in this embodiment denote the same parts as in the first to fourth embodiments, and a detailed description thereof will be omitted.

[Management of Project DB and Colorimetric Value DB]

Figure 37:
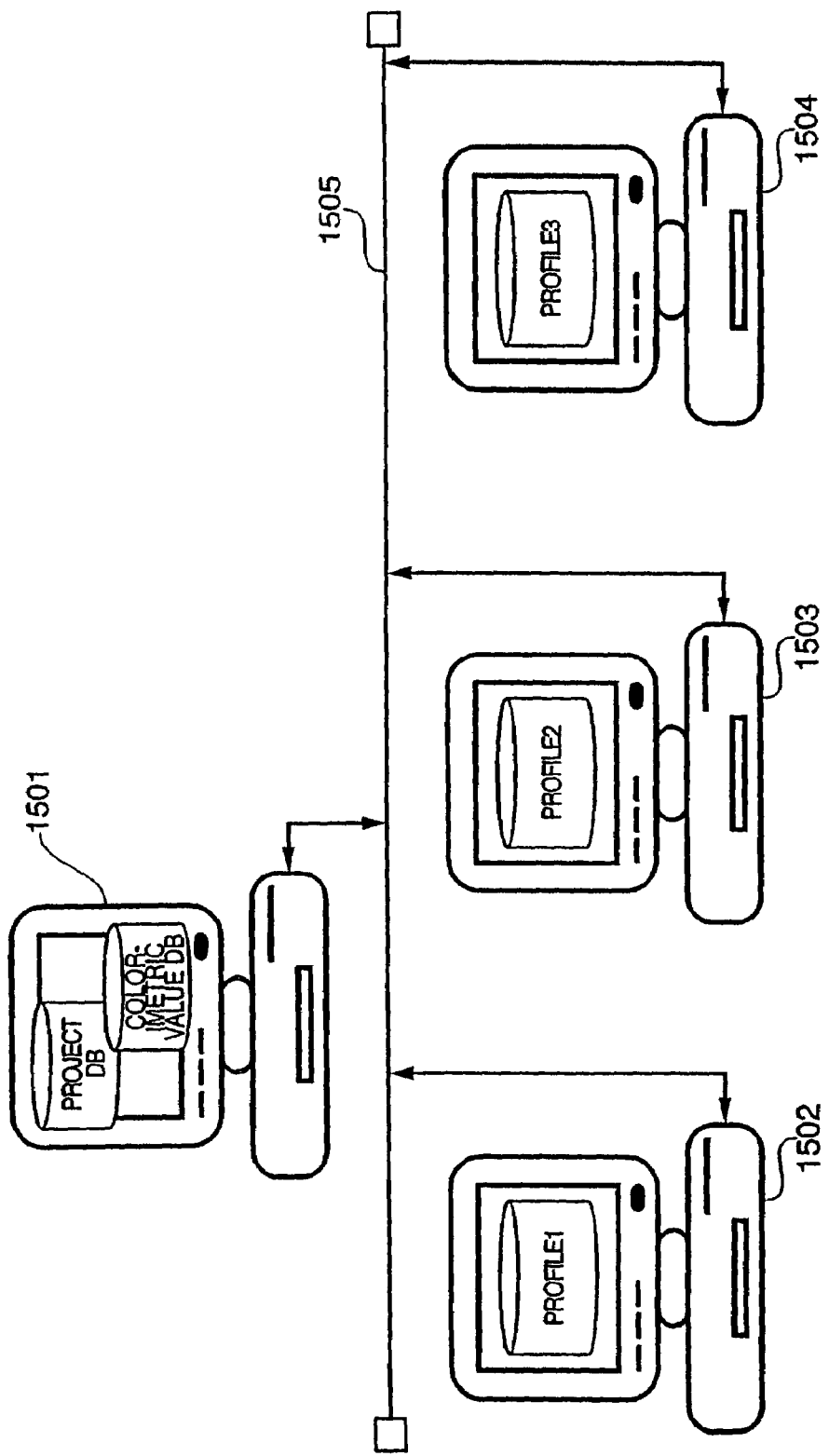
FIG. 37 is a diagram showing a method of managing a project DB and colorimetric value DB.

FIG. 37 is a diagram showing the method of managing the project DB and colorimetric value DB.

The project DB that collects information required for generating profiles and the colorimetric value DB that collects colorimetric value data used in generation of profiles are present on a server 1501, and the generated profiles are present on clients 1502 to 1504.

The profile generation module 1003 of each client analyzes the generated profile, and acquires required information from the respective DBs. Upon generating a new profile, the profile generation module 1003 registers history management information and colorimetric value data in the respective databases. Note that the project DB and colorimetric value DB need not be present on the single server 1501 as long as they allow cross reference, and may be distributed on two servers. Also, the database may be an ODB (Object-oriented Data Base), RDB (Relational Data Base), or a general data file.

Figure 38:
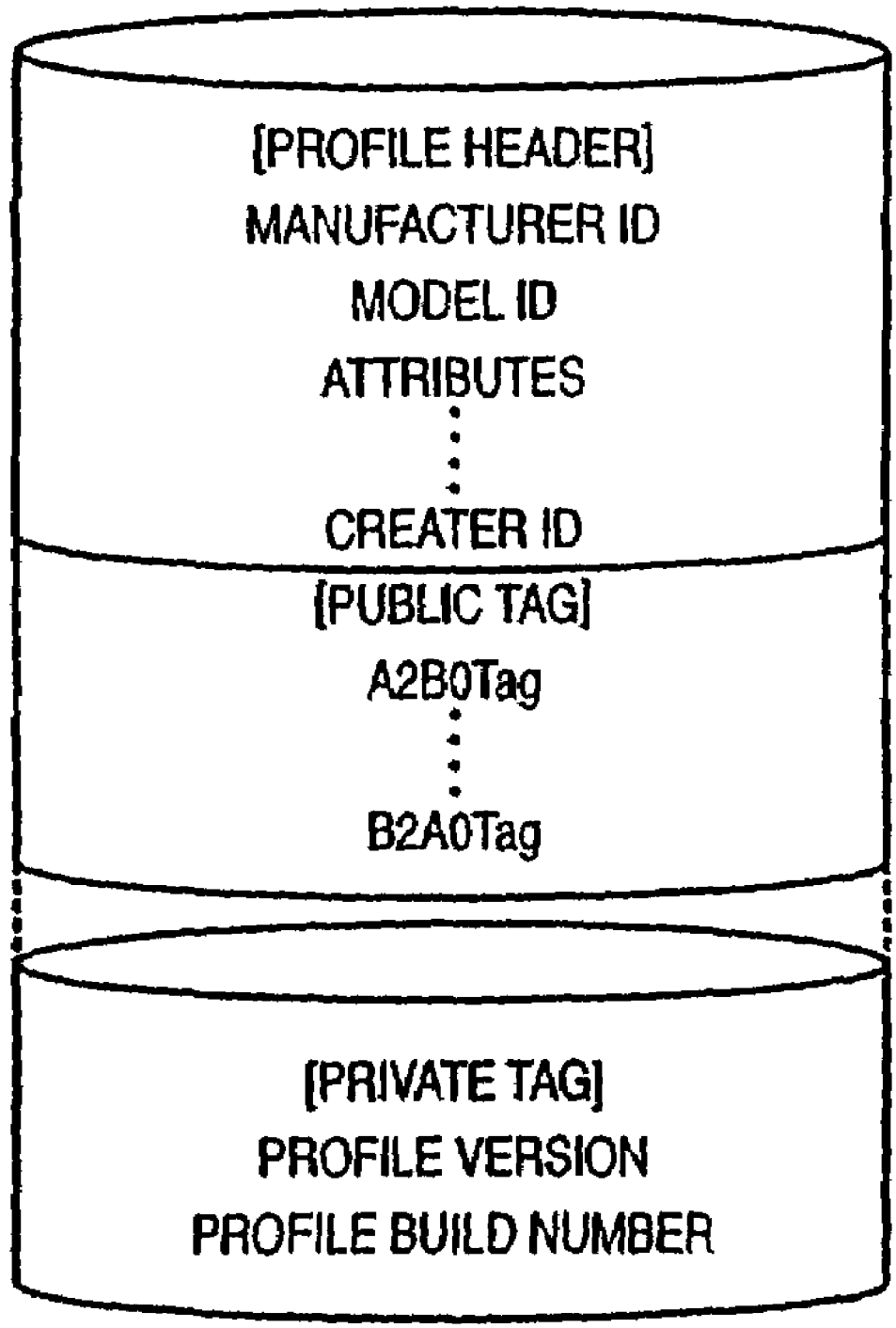
FIG. 38 shows an example of the format of a profile.

As shown in FIG. 38, a private tag of each profile stores information such as a profile version, profile build number, and the like to allow a database search. Note that the profile version is a number used to manage a release version. Also, the profile build number indicates the number of times a profile is built for release, and is automatically incremented by the profile generation module 1003.

Figure 39:
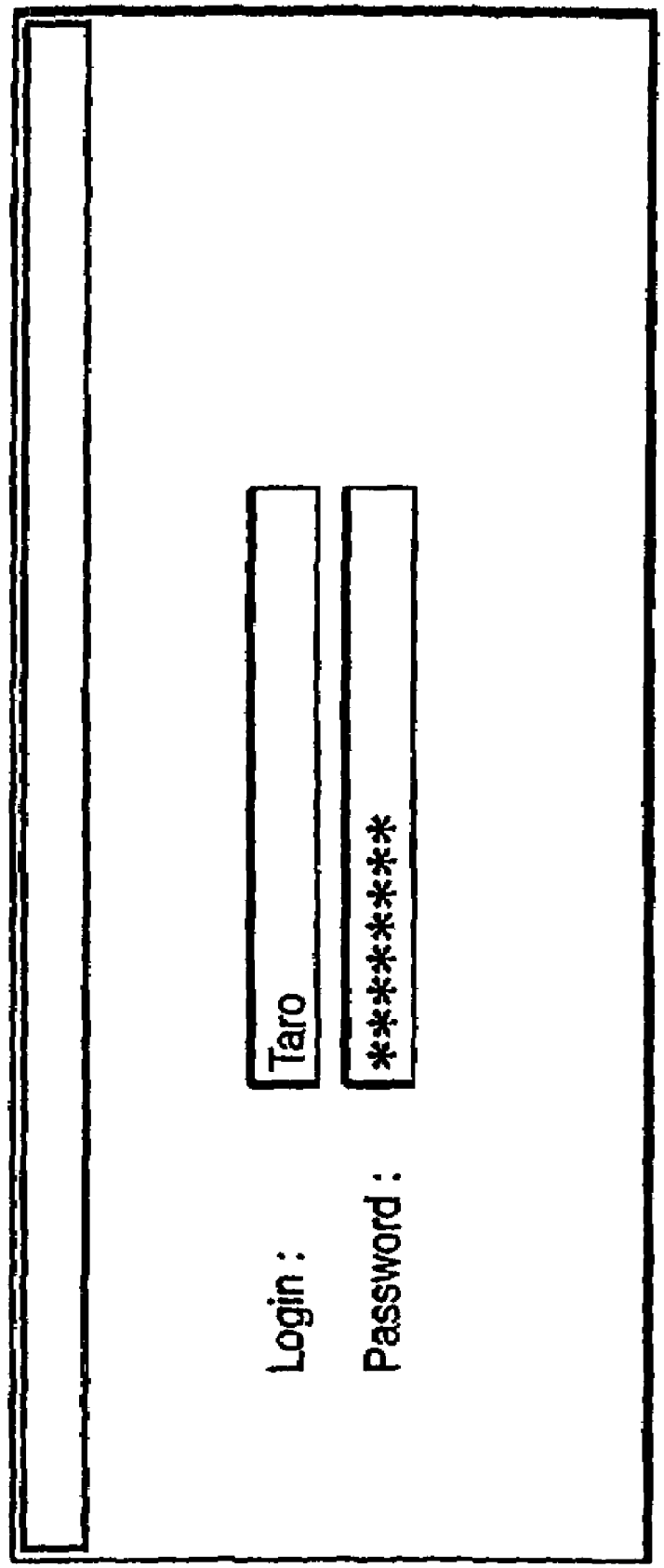
FIG. 39 shows a display example of a login window.

When the profile generation module 1003 is launched on each client, a login window shown in, e.g., FIG. 39 is displayed on the monitor of the client so as to establish connection to the databases. When the user of the client inputs an authentic login name and password to the login window, the profile generation module 1003 which runs on the client is connected to the project DB and colorimetric value DB. A case will be exemplified below wherein each database is an RDB.

As shown in FIG. 40, the project DB stores a user name, profile information, colorimetric value ID, profile generation parameters, and the like as a project table.

As shown in FIG. 41, the colorimetric value DB stores a colorimetric value ID, colorimetry information, actual colorimetric value data, and the like as a measurement table. If different colorimetric value data for a single color device are stored, new colorimetric value data can be generated by computing simple or weighted means values of colorimetric value data of different colorimetry dates. For example, by computing simple mean values of colorimetric value data of colorimetric value IDs=1 and 2, colorimetric value data of colorimetric value ID=3 can be generated.

[Use of Project DB]

Upon reading a profile, the profile generation module 1003 collects information from the read profile. Then, the profile generation module 1003 sends, e.g., the following inquiry to the project DB.

SELECT COUNT(*) FROM ProjectTable
WHERE User='Taro' AND ManufacturerID='CANO' AND Attribute='00000000' AND CreatorID='CANO' AND ProfileVersion=1 AND BuildNumber=1

In the above inquiry, "User", "ManufacturerID", "Attribute", "CreatorID", "ProfileVersion", and "BuildNumber" respectively indicate the fields of the user name, manufacturer ID, attribute, creator ID, profile version, and profile build number, and the project DB returns a value indicating whether or not a record satisfying the conditions of these fields is stored to COUNT.

[Automatic Re-set of Profile Generation Parameter and Acquisition of Colorimetric Value Data]

When the project DB returns "0" in response to the above inquiry, it indicates a profile, the history of which does not remain on the project DB. The profile generation module 1003 then displays a message "not registered in database" or the like on the monitor.

When the project DB returns "1" in response to the above inquiry, it indicates a profile, the history of which remains on the project DB. The profile generation module 1003 can reproduce setup parameters upon generating a profile as default values of profile generation parameters. Hence, the user can know profile generation parameters used upon generating the read profile.

When the project DB returns "2" or more in response to the above inquiry, it indicates an error.

When the user wants to know profile generation parameters, or when he or she wants to regenerate a profile by finely adjusting the profile generation parameters, the profile generation module 1003 acquires colorimetric value data from the colorimetric value DB by the following inquiry.

SELECT colorimetric value data FROM ProjectTable, MeasurementTable
WHERE User='Taro' AND ManufacturerID='CANO' AND Attribute='00000000' AND CreatorID='CANO' AND ProfileVersion=1 AND BuildNumber=1 AND ProjectTable.colorimetric value ID=MeasurementTable.colorimetric value ID When a profile is regenerated, that profile is registered in the project DB as a new profile.

[Generation of New Profile and Automatic Assignment of Profile Build Number]

When a new profile is generated, the profile generation module 1003 sends, e.g., the following inquiry to the project DB.

SELECT COUNT(*) FROM ProjectTable
WHERE User='Taro' AND ManufacturerID='CANO' AND Attribute='00000000' AND CreatorID='CANO' AND ProfileVersion=1

Since the project DB returns the profile build number corresponding to the designated device and profile version to COUNT, the profile generation module 1003 sets that profile build number in the generated profile. At the same time, the profile generation module 1003 registers profile information, colorimetric value ID, and profile generation parameters in the project DB.

As the colorimetric value ID registered in the project ID, when new colorimetric value data are used, a colorimetric value ID obtained by registering data in the colorimetric value DB is used; when existing colorimetric value data on the colorimetric value DB are used, the corresponding colorimetric value ID is used.

[History Function]

In this embodiment, since all previous profile generation histories are registered in the database, not only an immediately preceding profile generation environment but also all previous profile generation environments can be reproduced. For example, the number of times a specific profile has been previously generated can be inquired using the following inquiry.

SELECT COUNT(*) FROM ProjectTable
WHERE User='Taro' AND ManufacturerID='CANO' AND Attribute='00000000' AND CreatorID='CANO'

If each database contains time stamp information, the profile generation module 1003 can generate a list of profile generation histories with time stamps on the monitor. The user can select a previous profile generation history with reference to this list, and can reproduce setups of profile generation parameters used previously. When each database contains the time stamp information, the profile regeneration timing can be estimated while considering an environmental variation such as a weather variation from the generating timing of the profile in the past.

In this manner, since this embodiment integrally manages the profile generation histories and colorimetric value data of each user using the databases, statistical processes such as estimation of the profile regeneration timing and the like from information registered in the databases can be easily done.

When the profile generation module 1003 runs on a standalone PC, the project DB and colorimetric value DB can be implemented as general data files without using the RDB and ODB. The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An estimating method of estimating a profile regeneration timing of a device, comprising the steps of:
    reading colorimetry histories of a device, which include colorimetric values and time stamps of different timings, from a memory area;
    estimating a profile regeneration timing from the read time serial colorimetry histories, wherein the regeneration timing is estimated based on a color difference of a specific color region; and
    outputting information to inform arrival of the estimated regeneration timing.

2. The method according to claim 1, wherein an output timing of the information is set by a user.

3. An estimating method of estimating a profile regeneration timing of a device, comprising the steps of:
    reading colorimetry histories of a device, which include colorimetric values and time stamps of different timings, from a memory area;
    estimating a profile regeneration timing from the read time-serial colorimetry histories, wherein the regeneration timing is estimated based on an average value of plural regeneration terms, each of which indicates a term between the past regeneration timings; and
    outputting information to inform arrival of the estimated regeneration timing.

4. An estimating method of estimating a profile regeneration timing of a device, comprising the steps of:
    reading colorimetry histories of a device, which include colorimetry values and time stamps of different timings from a memory area;
    estimating a profile regeneration timing from the read time-serial colorimetry histories, wherein the regeneration term is estimated by calculating a timing of an approximate curve, which is obtained from the colorimetry histories, being departed from a permissible range.

5. A computer-executable program stored on a computer-readable medium comprising program code causing a computer to perform an estimating method of estimating a profile regeneration timing of a device, the method comprising:
    a reading step of reading colorimetry histories of a device, which include at least colorimetric values and time stamps of different timings, from a memory area designated by a user;
    an estimating step of estimating a profile regeneration timing from the read time serial colorimetry histories, wherein the regeneration timing is estimated based on a color difference of a specific color region; and
    an outputting step of outputting information to inform arrival of the estimated regeneration timing.

* * * * *